United States Patent
Min

(10) Patent No.: US 10,372,498 B2
(45) Date of Patent: Aug. 6, 2019

(54) DYNAMIC VIRTUAL CPU CORE ALLOCATION

(71) Applicant: INTEL CORPORATION, Santa Clara, CA (US)

(72) Inventor: Alexander W. Min, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 145 days.

(21) Appl. No.: 15/276,252

(22) Filed: Sep. 26, 2016

(65) Prior Publication Data

US 2018/0088997 A1 Mar. 29, 2018

(51) Int. Cl.

| G06F 12/00 | (2006.01) |
| G06F 13/00 | (2006.01) |
| G06F 13/28 | (2006.01) |
| G06F 9/50 | (2006.01) |
| G06F 1/3206 | (2019.01) |
| G06F 12/0864 | (2016.01) |
| G06F 11/34 | (2006.01) |
| G06F 11/30 | (2006.01) |
| G06F 9/455 | (2018.01) |

(52) U.S. Cl.
CPC .......... *G06F 9/5027* (2013.01); *G06F 1/3206* (2013.01); *G06F 9/45533* (2013.01); *G06F 11/301* (2013.01); *G06F 11/3037* (2013.01); *G06F 11/3051* (2013.01); *G06F 11/3433* (2013.01); *G06F 12/0864* (2013.01); *G06F 11/3096* (2013.01); *G06F 11/3466* (2013.01); *G06F 2009/4557* (2013.01); *G06F 2009/45583* (2013.01); *G06F 2009/45591* (2013.01); *G06F 2212/6032* (2013.04); *Y02D 10/26* (2018.01)

(58) Field of Classification Search
CPC ............ G06F 9/45533; G06F 11/3051; G06F 11/3096; G06F 11/3466
USPC ......................................................... 711/119
See application file for complete search history.

(56) References Cited

U.S. PATENT DOCUMENTS

| 2010/0274890 A1 | 10/2010 | Patel et al. |
| 2010/0306382 A1 | 12/2010 | Cardosa et al. |
| 2013/0073730 A1 | 3/2013 | Hansson et al. |
| 2015/0160983 A1* | 6/2015 | Kulkarni ............. G06F 9/45558 709/226 |

(Continued)

OTHER PUBLICATIONS

"Cache Monitoring Technology and Cache Allocation Technology", Intel Xeon E5-2600, http://www.intel.com/content/www/us/en/communications/cache-monitoring-cache-alloc . . . , Dec. 15, 2016, 5 pages.

(Continued)

*Primary Examiner* — Edward J Dudek, Jr.
*Assistant Examiner* — Sidney Li
(74) *Attorney, Agent, or Firm* — Grossman, Tucker, Perreault & Pfleger, PLLC

(57) ABSTRACT

The systems and methods described herein provide power management circuitry that factors one or more cache parameters (e.g., cache utilization) of an application or VM when determining pCPU-vCPU core remapping. By considering a more robust mix of both processor and cache memory related parameters, system performance and stability are increased by improving CPU and cache utilization and efficiency while reducing cache related issues such as collisions and/or pollution.

24 Claims, 6 Drawing Sheets

(56) References Cited

U.S. PATENT DOCUMENTS

2016/0246652 A1* 8/2016 Herdrich .............. G06F 9/5077

OTHER PUBLICATIONS

International Search Report and Written Opinion issued in PCT Application No. PCT/US2017/048723, dated Dec. 1 2017, 15 pages.
International Preliminary Report on Patentability issued in PCT Application No. PCT/US2017/048723, dated Apr. 4, 2019, 12 pages.

* cited by examiner

DYNAMIC VIRTUAL CPU CORE ALLOCATION

TECHNICAL FIELD

The present disclosure relates to physical CPU core consolidation in virtualized environments.

BACKGROUND

A virtual machine emulates a particular computing platform to provide the system user with flexibility and/or options in allocating workload and execution across the platform. For example, while a system executes a first operating system (e.g., WINDOWS®) a particular application may operate more efficiently under a second operating system (e.g., LINUX), in such instances, the application may be executed in a LINUX environment emulated via a virtual machine. While the virtual machine offers an emulated operating environment, such virtual machines share physical system resources such as one or more physical CPU cores and cache memory coupled to the physical CPU core. While desktop, workstation, and server systems may provide sufficient CPU core bandwidth and cache memory, smaller platforms such as portable devices, smartphones, wearable computing devices, and handheld computing devices may have limited physical resources.

Current mobile platform virtualization permits multiple operating systems executed by virtual machines to share system or platform physical resources such as CPUs, graphical processing units (GPUs), memory, input/output interfaces, and similar. Mobile virtualization enjoys increasing popularity to accommodate an increasing number of mobile applications and/or services such as connectivity, security, entertainment, location determination, and similar. The feasibility of mobile virtualization increases as mobile platforms are equipped with increasing quantities of system resources, such as multiple CPU cores, GPUs, and larger and high clock speed memory and I/O.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
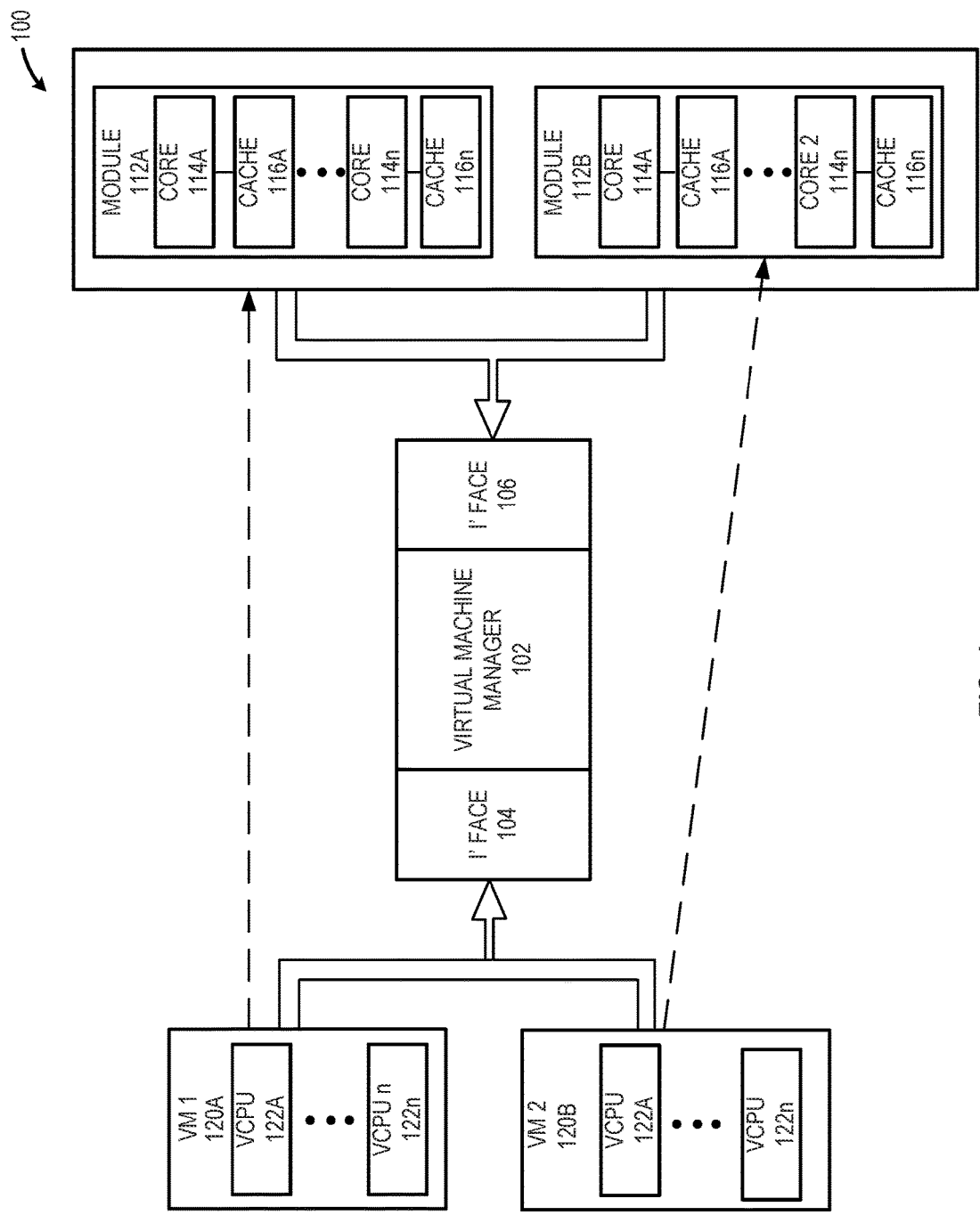
FIG. 1 is a high level block diagram of an illustrative system in which a virtual machine manager monitors and consolidates physical resources as a first module executes a first virtual machine and a second module executes a second virtual machine, in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

Virtual mobile platforms employ a number of power management techniques including physical CPU (pCPU) to virtual CPU (vCPU) remapping (a.k.a. CPU concurrency or core shielding) to reduce power consumption by reducing the number of active CPU cores, when possible, without compromising application performance and user experience. While such mobile platforms usually offer significant benefits in terms of performance, cost, and security, mobile virtualization complicates platform resource allocation and power management, particularly when system resources are shared among several virtual machines and/or applications. Power management algorithms in virtualized mobile platforms may rely on simple or singular statistics such as average CPU utilization in making power management decisions such as CPU core allocation. Such CPU-utilization-based algorithms are agnostic to other, potentially important and/or system critical, performance metrics such as cache pollution, memory latency, and/or memory bandwidth. Thus, power management algorithms may result in undesirable and/or unexpected system performance degradation. For example, if applications executing on virtual machine 1 (VM1) are cache-hungry (e.g., file hosting or video streaming), sharing the same physical CPU cores with applications executed by virtual machine 2 (VM2) via pCPU-vCPU remapping, the cache miss rate and memory/cache latency may increase because applications executing in VM2 are able to overwrite at least some of the data in the low-level cache (LLC) with new data and invalidate VM1's application cache operations (i.e., cache pollution).

To avoid such potential performance degradation due to cache contention and pollution, current power management algorithms prioritize virtual machines and/or workloads if they share the same physical CPU core. For example, a virtual machine manager (VMM) may schedule VM2 only when there is no request for access pending from VM1. In so doing, the VMM may minimize the risk of cache contention and/or pollution from contending virtual machines and/or applications. However, such a prioritization approach may not be sufficient or appropriate to provide the required level of performance for the lower priority applications.

The systems and methods described herein address the aforementioned issues through the use of power management circuitry having greater accuracy and efficiency in making power management decisions while providing improved performance by:

1. Cache and/or resource aware power management decisions that factor application cache utilization prior to making pCPU-vCPU remapping decisions; and 2. Application and/or VM level cache allocations that different amounts of cache space to applications based on an actual cache footprint of the application.

The systems and methods described herein provide power management circuitry that factors one or more cache parameters (e.g., cache utilization) of an application or VM when determining pCPU-vCPU core remapping. By considering a more robust mix of both processor and cache memory related parameters, system performance and stability are increased by improving CPU and cache utilization and efficiency while reducing cache related issues such as collisions and/or pollution. Example parameters considered in consolidating vCPUs on pCPUs include cache utilization, available CPU frequencies, available memory bandwidth, and similar. The power management circuitry may obtain such parameters from the virtual machine manager executing on the system, may evaluate the impact of pCPU consolidation prior to physically consolidating a number of vCPUs to a reduced number of pCPUs.

A performance monitoring system for virtual machines is provided. The system may include performance monitoring circuitry to determine performance data indicative of at least one parameter logically associated with each of a plurality of virtual machines; resource monitoring circuitry to determine resource data indicative of: at least one physical core parameter logically associated with each of a plurality of physical cores and at least one physical cache parameter; and at least physical cache parameter logically associated with each of a plurality of physical caches, each of the physical caches communicably coupled to a respective one of the plurality of physical cores; and power management circuitry to determine whether to consolidate at least two of the plurality of virtual machines based, at least in part, on the determined performance data and the determined resource data.

A processor-based device that includes a performance monitoring system is provided. The system may include at least one central processing unit (CPU) that includes a plurality physical cores, each of the plurality of physical cores communicably coupled to a respective one of a plurality of physical caches; and a performance monitoring system for virtual machines, comprising: performance monitoring circuitry to determine performance data indicative of at least one parameter logically associated with each of a plurality of virtual machines; resource monitoring circuitry to determine resource data indicative of: at least one physical core parameter logically associated with each of a plurality of physical cores and at least one physical cache parameter; and at least physical cache parameter logically associated with each of a plurality of physical caches, each of the physical caches communicably coupled to a respective one of the plurality of physical cores; and power management circuitry to determine whether to consolidate at least two of the plurality of virtual machines based, at least in part, on the determined performance data and the determined resource data.

A performance monitoring method to consolidate a plurality of virtual machines on a plurality of physical cores, each communicably coupled to a respective one of a corresponding plurality of physical caches is provided. The method may include determining, by performance monitoring circuitry, performance data indicative of at least one parameter logically associated with each of a plurality of virtual machines; determining, by resource monitoring circuitry, resource data indicative of: at least one physical core parameter logically associated with each of the plurality of physical cores; and at least physical cache parameter logically associated with each of the plurality of physical caches, each of the physical caches communicably coupled to a respective one of the plurality of physical cores; and determining, by power management circuitry, whether to consolidate at least two of the plurality of virtual machines based, at least in part, on the determined performance data and the determined resource data.

A performance monitoring system to consolidate a plurality of virtual machines on a plurality of physical cores, each communicably coupled to a respective one of a corresponding plurality of physical caches is provided. The system may include a means for determining performance data indicative of at least one parameter logically associated with each of a plurality of virtual machines; a means for determining resource data indicative of: at least one physical core parameter logically associated with each of the plurality of physical cores; and at least physical cache parameter logically associated with each of the plurality of physical caches, each of the physical caches communicably coupled to a respective one of the plurality of physical cores; and a means for determining whether to consolidate at least two of the plurality of virtual machines based, at least in part, on the determined performance data and the determined resource data.

A storage device that includes one or more machine readable instruction sets is provided. The machine readable instruction sets, when executed by circuitry, cause the circuitry to transform to a virtual machine manager, the virtual machine manager to: cause performance monitoring circuitry to determine performance data indicative of at least one parameter logically associated with each of a plurality of virtual machines; cause resource monitoring circuitry to determine resource data indicative of: at least one physical core parameter logically associated with each of a plurality of physical cores; and at least physical cache parameter logically associated with each of a plurality of physical caches, each of the physical caches communicably coupled to a respective one of the plurality of physical cores; and cause power management circuitry to determine whether to consolidate at least two of the plurality of virtual machines based, at least in part, on the determined performance data and the determined resource data.

A system for managing physical resources allocated to a plurality of virtual machines is provided. The system may be arranged to perform the method of any of examples 19 through 28.

A chipset arranged to perform the method of any of examples 19 through 28 is provided.

A machine readable medium comprising a plurality of instructions that, in response to be being executed on a computing device, cause the computing device to carry out the method according to any of examples 19 through 28 is provided.

A device configured to manage physical resources allocated to a plurality of virtual machines, the device being arranged to perform the method of any of examples 19 through 28 is provided.

FIG. 1 provides a high level block diagram of an illustrative system 100 in which a virtual machine manager 102 monitors and consolidates physical resources as a first module 112A executes 124A a first virtual machine 120A and a second module 112B executes 124B a second virtual machine 120B, in accordance with at least one embodiment described herein. As depicted in FIG. 1, the first virtual machine 120A is implemented by one or more virtual central processing units 122A-122n (collectively, "virtual CPUs 122") and the second virtual machine 120B is similarly implemented using one or more vCPUs 122 that may or may not be the same vCPUs 122 used to implement the first virtual machine 120A. The first module 112A and the second module 112B may be implemented using one or more central processing units (CPUs) 110. Each module 112 includes a plurality of physical cores 114A-114n (collectively, "physical cores 114") each of which are communicably coupled to a respective one of a plurality of physical caches 116A-116n (collectively, "physical caches 116").

The virtual machine manager 102 includes a first interface 104 to unidirectionally or bidirectionally communicate information and/or data indicative of one or more virtual machine parameters from at least some of the virtual machines 120. Example virtual machine parameters may include, but are not limited to, information and/or data associated with one or more applications executed by some or all of the virtual machines 120. Example virtual machine parameters may include, but are not limited to, information and/or data associated with the one or more virtual CPUs 122 used to execute the applications.

The virtual machine manager 102 also includes a second interface 106 to unidirectionally or bidirectionally communicate information and/or data indicative of one or more physical resource parameters from at least some of the modules 112. Example physical resource parameters include, but are not limited to, physical core utilization, physical core frequency, physical core efficiency, physical cache utilization, physical cache read and/or write rate, and similar.

Using the information and/or data received from the virtual machines 120, from the physical cores 114, and from the physical caches 116, the virtual machine manager 102 determines whether to consolidate physical cores 114 and/or caches 116. By considering both power consumption or utilization of the physical cores 114 and utilization of the physical caches 116, the virtual machine manager 102 is able to advantageously consolidate physical resources when both power savings are possible AND the likelihood of memory conflicts and/or memory pollution is beneficially reduced. Reducing power consumption and consolidating physical cache with minimal compromise on data integrity or reliability beneficially improves the speed, reliability, and integrity of the host system 100. This is particularly true over prior consolidation schemes which considered only power consumption and paid little attention to or ignored the potentially detrimental effects of data loss, data conflicts, and/or data pollution when consolidating the physical caches 116 coupled to the physical cores 114 being consolidated.

For example, the virtual machine manager 102 may receive information and/or data indicative of physical CPU utilization sufficiently low to permit the consolidation of the load on the physical cores 114 in module 112B to the physical cores 114 in module 112A. At this point, many conventional power management systems would consolidate the load to the physical cores 114 in module 112A. However, in the systems and methods described herein, the virtual machine manager 102 also determines whether the load on the physical caches 116 in module 112B are sufficiently low to enable consolidation with the physical caches 116 in module 112A prior to consolidating the load to module 112A. Such beneficially reduces the possibility of cache pollution, cache conflicts, and potential data loss or questionable data integrity within the physical caches 116.

Figure 2:
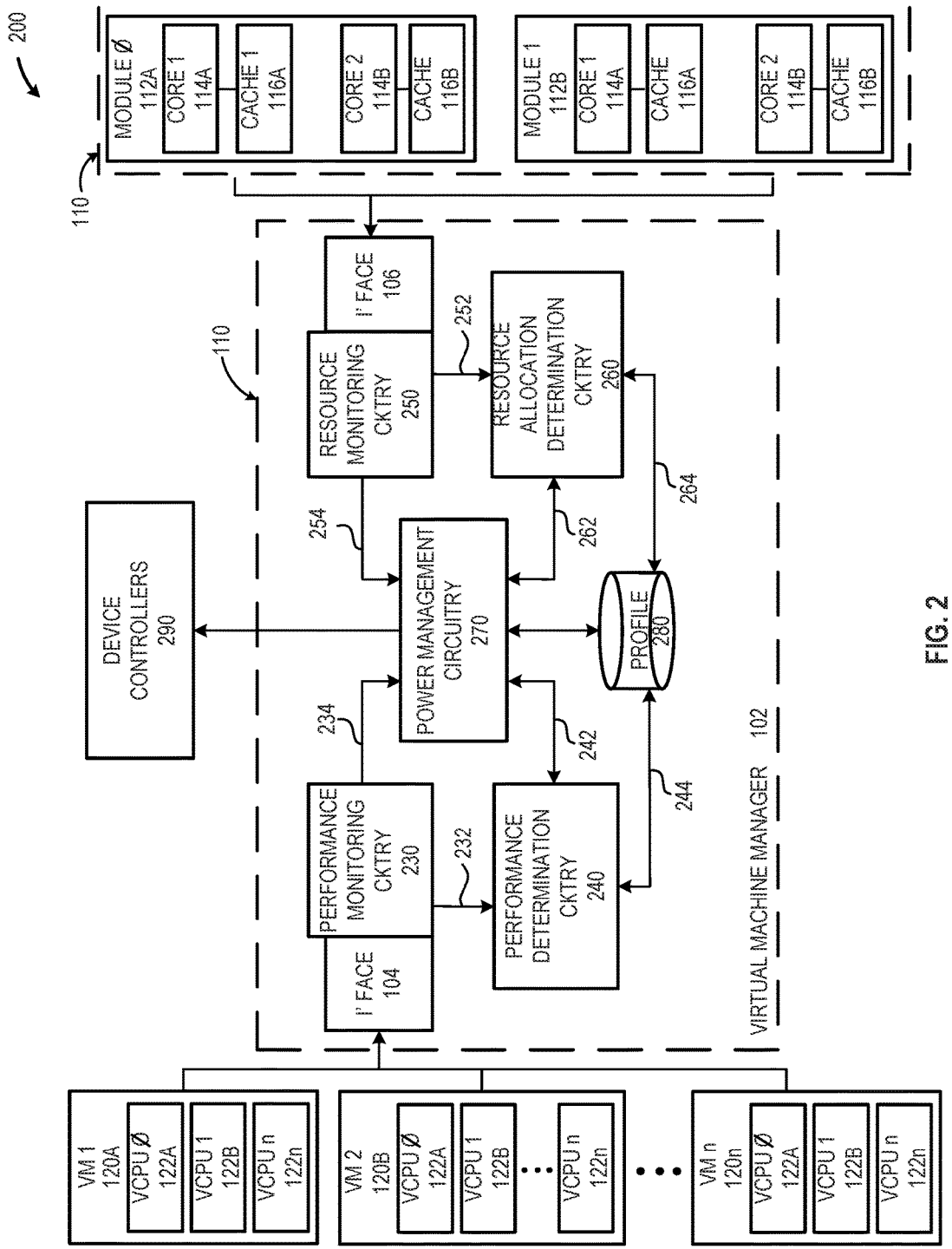
FIG. 2 is a block diagram of an illustrative virtual machine manager, in accordance with at least one embodiment described herein.

FIG. 2 provides a block diagram of an illustrative virtual machine manager 102, in accordance with at least one embodiment described herein. As depicted in FIG. 2, each of the modules 112 includes a plurality of physical cores (two shown) 114A and 114B (collectively, "cores 114"). Each of the physical cores 114A and 114B communicably couples to a respective cache 116A and 116B. Although only two modules 112, each including two cores 114, are shown in FIG. 1, each module 112 may include any number of physical cores 114. Further, the CPU 110 may include any number of modules 112. For example, a mobile device may have a single CPU 110 that includes four modules 112A-112D, each of the modules 112 including a first physical CPU core 114A and a second physical CPU core 114B, for a total of eight (8) physical cores 114. Continuing with the previous example, each of the eight cores 114 may be communicably coupled to a cache 116 that provides high data read and/or transfer rates with the physical core 114 to which the cache 116 is coupled. In embodiments, each core 114 may simultaneously execute one or more threads.

Some or all of the physical cores 114 and the associated physical caches 116 may be used to host and provide resources for use by at least some of the virtual machines 120. For example, both physical cores 114A and 114B in module 112A may be used to host virtual machine 120A and both physical cores 114A and 114B in module 112B may be used to host virtual machine 120B. Thus, virtual CPUs 122A-122n used by virtual machine 120A to execute one or more applications place a computational load or demand on the physical cores 114A and 114B in module 112A. Virtual CPUs 122A-122n used by virtual machine 120A may also consume at least a portion of the physical caches 116A and 116B coupled to physical cores 114A and 114B in module 112A. Likewise, virtual CPUs 122A-122n used by virtual machine 120B to execute one or more applications place a computational load or demand on the physical cores 114A and 114B in module 112B. Virtual CPUs 122A-122n used by virtual machine 120B may also consume at least a portion of the physical caches 116A and 116B coupled to physical cores 114A and 114B in module 112B.

The virtual machine manager 102 includes performance monitoring circuitry 230 to collect performance and other operational assessment information and/or data from some or all of the virtual machines 120 under the current operating regime. The virtual machine manager 102 also includes resource monitoring circuitry 250 to collect performance and other operational assessment information and/or data from the CPUs 110 under the current operating regime. The virtual machine manager 102 additionally includes performance determination circuitry 240 to determine one or more proposed virtual machine operating regimes for some or all of the virtual machines 120. The performance determination circuitry 240 also determines the performance impact and/or power consumption impact on the system 100 under each of the one or more proposed virtual machine operating regimes. The virtual machine manager 102 further includes resource allocation determination circuitry 260 to determine the physical resources (e.g., physical cores 114 and/or physical cache 116) needed to support the current operational load presented by at least the virtual machines 120. The resource allocation determination circuitry 260 may determine a resource allocation needed to achieve each of the proposed virtual machine operating regimes determined by the resource monitoring circuitry 250. The resource allocation determination circuitry 260 allocates the physical resources based on one or more defined physical resource allocation policies. The virtual machine manager 102 further includes power management circuitry 270. The power management circuitry 270 selects one of the one or more proposed virtual machine operating regimes and redistributes the physical resource load of some or all of the virtual machines across the physical cores 114 and/or physical caches 116.

The performance monitoring circuitry 230 communicably couples to at least a portion of the virtual machines 120 to collect, receive, or otherwise acquire performance and operational assessment information and/or data from some or all of the virtual machines 120. The performance monitoring circuitry 230 communicates at least a portion of the collected, received, or otherwise acquired information and/or data to the performance determination circuitry 240. The performance monitoring circuitry 230 may also communicate at least a portion of the collected, received, or otherwise acquired information and/or data to the power management circuitry 270.

In some implementations, the performance monitoring circuitry 230 periodically, intermittently, or continuously monitors some or all of the applications executed on or by some or all of the virtual machines 120. In some implementations, the performance monitoring circuitry 230 periodically, intermittently, or continuously monitors the virtual CPU 122 performance of some or all of the virtual machines 120. In implementations, the performance monitoring circuitry 230 may use software and/or hardware counters alone or in combination to determine whether some or all of the virtual CPUs 122 meet defined performance metrics and/or parameters and also to detect changes in virtual machine performance as a result of physical resource consolidation such as combining physical cores 114 and/or caches 116. In implementations, the performance monitoring circuitry 230 may be used to detect abnormal or unacceptable and/or unsatisfactory performance of one or more virtual machines 120 and/or one or more virtual CPUs 122. In some implementations, the performance monitoring circuitry 230 may assess the impact of the proposed virtual machine operating regime selected by the power management circuitry 270 on the performance of the applications executed by some or all of the virtual machines 120. In some implementations, the performance monitoring circuitry 230 may assess the impact of the proposed virtual machine operating regime selected by the power management circuitry 270 on the performance of some or all of the virtual CPUs 122 in some or all of the virtual machines 120.

The performance monitoring circuitry 230 may include any number and/or combination of any currently available or future developed electronic devices and/or semiconductor components capable of monitoring one or more performance aspects and/or parameters of at least one of the virtual machines 120. In some implementations, the performance monitoring circuitry 230 may include one or more configurable or programmable elements, such as one or more configurable integrated circuits, capable of executing machine-readable instruction sets that cause the configurable or programmable elements to combine in a particular manner to create the performance monitoring circuitry 230. In some implementations, the performance monitoring circuitry 230 may include one or more stand-alone devices or systems, for example, the performance monitoring circuitry 230 may be embodied in a single surface- or socket-mount integrated circuit. In other implementations, the performance monitoring circuitry 230 may be provided in whole or in part via one or more processors, controllers, digital signal processors (DSPs), reduced instruction set computers (RISCs), systems-on-a-chip (SOCs), application specific integrated circuits (ASICs) capable of providing all or a portion of the virtual machine manager 102. In some implementations, the performance monitoring circuitry 230 may include one or more communication interfaces to facilitate the communication of information and/or data to the performance determination circuitry 240 and to the power management circuitry 270.

In embodiments, the performance monitoring circuitry 230 may poll performance data and/or parameters from some or all of the virtual CPUs 122 in some or all of the virtual machines 120 on a periodic, intermittent or continuous basis. In other embodiments, the performance monitoring circuitry 230 may receive performance data and/or parameters broadcast by or otherwise transmitted from some or all of the virtual machines 120 on a periodic, intermittent, or continuous basis. Example virtual machine performance data and/or parameters include, but are not limited to: vCPU utilization, vCPU frequency; cache memory usage; cache memory access time; cache memory read time; application execution time; screen refresh rates; and similar.

The performance monitoring circuitry 230 communicates 232 the virtual machine performance information and/or data to the performance determination circuitry 240. In some implementations, the performance determination circuitry 240 may additionally or alternatively communicate at least a portion of the virtual machine performance and/or operational assessment data to the power management circuitry 270. In embodiments, the performance determination circuitry 240 determines an estimated power consumption, in the current operating regime and/or state, of some or all of the virtual machines 120, some or all of the virtual CPUs 122, and/or some or all of the applications executed by the virtual machines 120 and/or applications executed on the virtual CPUs 122.

In some implementations, the performance determination circuitry 240 may determine the estimated power consumption, in one or more proposed operating regimes or states, of some or all of the virtual machines 120, some or all of the virtual CPUs 122, and/or some or all of the applications executed by the virtual machines 120 and/or applications executed on the virtual CPUs 122. Such proposed operating regimes and/or states may include one or more proposed operating regimes or states where applications have been consolidated from a first number of virtual CPUs 122 executed by a first number of physical cores 114 to a smaller, second number of physical CPUs 122 executed by a smaller, second, number of physical cores 114. Such proposed operating regimes and/or states may include one or more proposed operating regimes or states where applications have been consolidated from a first number of caches 116 to a smaller, second number of caches 116.

The performance determination circuitry 240 communicates one or more signals 242 including information and/or data indicative of the determined power consumption for the current operating regime or state to the power management circuitry 270. The performance determination circuitry 240 may also communicate one or more signals 242 including information and/or data indicative of the determined power consumption for some or all of the one or more proposed operating regimes or states to the power management circuitry 270. The performance determination circuitry 240 may communicate the one or more signals to the power management circuitry 270 on a periodic, intermittent, or continuous basis.

The virtual machine manager 102 includes resource monitoring circuitry 250 communicably coupled to the one or more CPUs 110, the one or more physical cores 114, and/or the one or more caches 116. The resource monitoring circuitry 250 collects and communicates information and/or data representative of some or all CPU 110 physical resource parameters, such as core utilization, core temperature, core frequency, cache utilization, cache turnover, cache access time, etc., to the resource allocation determination circuitry 260 via one or more signals 252. In some implementations, the resource monitoring circuitry 250 may additionally or alternatively communicate information and/or data representative of some or all CPU 110 physical resource parameters, such as core utilization, core temperature, core frequency, cache utilization, cache turnover, cache access time, etc. to the resource allocation determination circuitry 260 via one or more signals 252.

The resource monitoring circuitry 250 may include any number and/or combination of any currently available or future developed electronic devices and/or semiconductor components capable of monitoring one or more performance aspects and/or parameters of the CPUs 110, the physical cores 114, and/or the caches 116. In some implementations, the resource monitoring circuitry 250 may include one or more configurable or programmable elements, such as one or more configurable integrated circuits, capable of executing machine-readable instruction sets that cause the configurable or programmable elements to combine in a particular manner to create the resource monitoring circuitry 250. In some implementations, the resource monitoring circuitry 250 may include one or more stand-alone devices or systems, for example, resource monitoring circuitry 250 may be embodied in a single surface- or socket-mount integrated circuit. In other implementations, the resource monitoring circuitry 250 may be provided in whole or in part via one or more processors, controllers, digital signal processors (DSPs), reduced instruction set computers (RISCs), systems-on-a-chip (SOCs), application specific integrated circuits (ASICs) capable of providing all or a portion of the virtual machine manager 102. The resource monitoring circuitry 250 may include one or more communication interfaces to facilitate the communication of one or more signals 252 including information and/or data indicative of one or more CPU parameters, one or more physical core parameters, and/or one or more cache parameters to the resource allocation determination circuitry 260. The resource monitoring circuitry 250 may additionally or alternatively include one or more communication interfaces to facilitate the communication of one or more signals 254 including information and/or data indicative of one or more CPU parameters, one or more physical core parameters, and/or one or more cache parameters to the power management circuitry 270.

In embodiments, the resource monitoring circuitry 250 may poll performance data and/or parameters from the CPU 110, some or all of the physical cores 114, and/or some or all of the caches 116 on a periodic, intermittent or continuous basis. In other embodiments, the resource monitoring circuitry 250 may receive performance data and/or parameters broadcast by or otherwise transmitted by the CPU 110, some or all of the physical cores 114, and/or some or all of the caches 116 on a periodic, intermittent, or continuous basis.

The resource monitoring circuitry 250 generates and communicates one or more signals 252 that include information and/or data indicative of one or more CPU parameters, one or more physical cache performance parameters, and/or one or more cache performance parameters to the resource allocation determination circuitry 260. In some implementations, resource monitoring circuitry 250 may additionally or alternatively communicates one or more signals 254 that include information and/or data indicative of one or more CPU parameters, one or more physical cache performance parameters, and/or one or more cache performance parameters to the power management circuitry 270.

The resource allocation determination circuitry 260 determines one or more values indicative of the estimated resources (physical core bandwidth, cache memory, etc.) needed to support the applications and/or virtual machines 120 executed by the CPU 110. In some implementations, the resource allocation determination circuitry 260 may determine the estimated resources for some or all of the proposed operating regimes or states provided by the performance determination circuitry 240. Such proposed operating regimes and/or states may include one or more proposed operating regimes or states where applications have been consolidated from a first number of virtual CPUs 122 executed by a first number of physical cores 114 to a smaller, second number of physical CPUs 122 executed by a smaller, second, number of physical cores 114. Such proposed operating regimes and/or states may include one or more proposed operating regimes or state where applications have been consolidated from a first number of caches 116 to a smaller, second number of caches 116.

The resource allocation determination circuitry 260 communicably couples to one or more storage devices 280. Such storage devices 280 may include one or more storage devices 280 disposed in or local to the device 100. Such storage devices 280 may include one or more storage devices 280 disposed remote from the device 100, for example one or more devices resident in a server communicably coupled to the device 100 via one or more wired and/or wireless networks. In some implementations, the one or more storage devices 280 may include, in whole or in part, one or more non-transitory memories disposed in, on, or about the virtual machine manager 102. In some implementations, the one or more storage devices 280 may include, in whole or in part, one or more read-only memories (ROMs) or one or more electrically erasable programmable read-only memories disposed in, on, or about the virtual machine manager 102. The one or more storage devices 280 may include one or more resource allocation policies enforced by the resource allocation determination circuitry 260 in determining resource allocations for each application, virtual machine 120, and/or virtual CPU 122. The resource allocation policies may be communicated via one or more signals 264 from the storage device 280 to the resource allocation determination circuitry 260.

The resource allocation determination circuitry 260 communicates one or more signals 262 including information and/or data indicative of the determined power consumption for some or all of the one or more proposed operating regimes or states to the power management circuitry 270. The resource allocation determination circuitry 260 may communicate the one or more signals 262 to the power management circuitry 270 on a periodic, intermittent, or continuous basis.

The resource allocation determination circuitry 260 may include any number and/or combination of any currently available or future developed electronic devices and/or semiconductor components capable of periodically, intermittently, or continuously determining the resource requirements to support some or all of the proposed operating regimes determined by the performance determination circuitry 240. In some implementations, the resource allocation determination circuitry 260 may include one or more configurable or programmable elements, such as one or more configurable integrated circuits, capable of executing machine-readable instruction sets that cause the configurable or programmable elements to combine in a particular manner to create the resource allocation determination circuitry 260. In some implementations, the resource allocation determination circuitry 260 may include one or more stand-alone devices or systems, for example, resource allocation determination circuitry 260 may be embodied in a single surface- or socket-mount integrated circuit. In other implementations, the resource allocation determination circuitry 260 may be provided in whole or in part via one or more processors, controllers, digital signal processors (DSPs), reduced instruction set computers (RISCs), systems-on-a-chip (SOCs), application specific integrated circuits (ASICs) capable of providing all or a portion of the virtual machine manager 102.

Based at least in part on the information and/or data received from the performance determination circuitry 240 and from the resource allocation determination circuitry 260, the power management circuitry 270 determines one whether to consolidate one or more physical resources to beneficially reduce system power demand, improve system performance, and/or enhance user experience. For example, in response to the information and/or data received from the performance determination circuitry 240 and from the resource allocation determination circuitry 260 and also based at least in part on the resource allocation policies obtained or otherwise retrieved from the storage device 280, the power management circuitry 270 may determine that an application executing under virtual machine 120B and using the physical cores 114 and physical caches 116 in module 112B may be physically consolidated with another application executing under virtual machine 120A and using the physical cores 114 and physical caches 116 in module 112A. Such a physical resource consolidation will reduce and may even eliminate the power demand imposed on the system by module 112B.

In some implementations, the power management circuitry 270 may include one or more stand-alone devices or systems, for example, power management circuitry 270 may be embodied in a single surface- or socket-mount integrated circuit. In other implementations, the power management circuitry 270 may be provided by all or a portion of one or more processors, controllers, digital signal processors (DSPs), reduced instruction set computers (RISCs), systems-on-a-chip (SOCs), application specific integrated circuits (ASICs) capable of providing all or a portion of the virtual machine manager 102.

The power management circuitry 270 uses all or a portion of the virtual machine performance information or data to allocate workload across the physical cores 114, allocate workload across the physical cache 116, and consolidate physical cores 114 and caches 116 when such consolidation meets defined policies such as reducing system power consumption, maintaining minimum application performance standards, and/or providing a suitable user experience (responsiveness, video quality, audio quality, etc.) stored in, on, or about the storage device 280.

The storage device 280 may be communicably coupled to the power management circuitry 250, the performance determination circuitry 240, and/or the resource allocation determination circuitry 260. The storage device 280 may include any size, combination, and/or number of storage devices capable of storing or otherwise retaining digital data. Example storage devices 280 include, but are not limited to, rotating magnetic storage devices, rotating optical storage devices, solid state storage devices, molecular storage devices, and/or quantum storage devices. In some implementations, the storage device 280 may include one or more currently available or future developed removable storage devices, such as one or more flash drives, one or more universal serial bus (USB) drives, one or more secure digital (SD) cards, or similar. The storage device 280 may include machine-executable instruction sets that cause a generic processor to provide a dedicated a particular, dedicated and specific virtual machine manager 102. The storage device 280 may include data representative of one or more device profiles that include operational parameters, thresholds, limits, and/or set points for the CPU 110, the modules 112, the physical cores 114 and/or the physical caches 116.

The storage device 280 may include data and/or information representative of one or more resource allocation policies enforced, at least in part, by the resource allocation determination circuitry 260. In some implementations, the power management circuitry 270 may use some or all of the operational parameters stored in, on, or about the storage device 280 to select or otherwise determine an operational configuration of the modules 112, physical cores 114, and/or physical caches 116 in the CPU 110.

The storage device 280 may include threshold data used by the virtual machine manager 102 in making the determination to consolidate physical cores 114 and/or caches 116 based at least in part on virtual CPU 122 utilization information and/or data received by the performance monitoring circuitry 230, physical core utilization information and/or data received by the resource monitoring circuitry 250, and/or physical cache utilization information and/or data received by the resource monitoring circuitry 250. Such threshold information may be used, in whole or in part, by the virtual machine manager 102 in making the decision to consolidate physical CPU cores 114 and/or physical caches 116.

For example, the power management circuitry 270 may use the stored threshold data to determine whether the physical core utilization 324A attributable to a first virtual machine 120A and the physical core utilization 324B attributable to a second virtual machine 120B are below defined utilization thresholds. If both physical core utilizations 324A, 324B are below defined utilization thresholds, the power management circuitry 270 determines whether the physical cache utilization 326A attributable to the first virtual machine 120A and the physical cache utilization 326B attributable to the second virtual machine 120B are below defined utilization thresholds. If both the physical core utilization 324 and the physical cache utilization 326 are below defined threshold utilizations, the power management circuitry 270 consolidates the first and the second virtual machines 120A, 120B on the physical cores 114 and physical caches 116 in a single module 112 formerly used to support only the first virtual machine 120A.

Figure 3A:
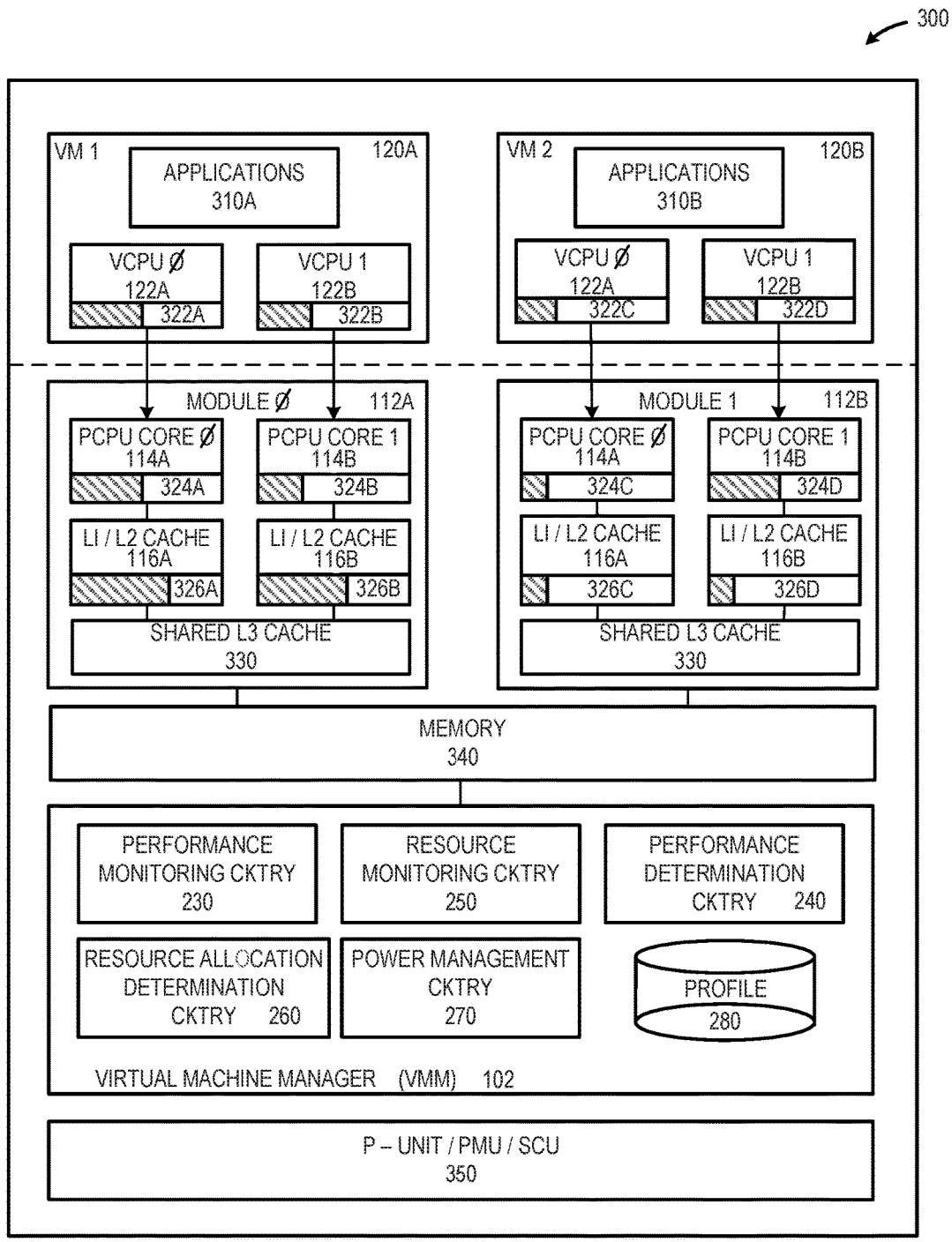
FIG. 3A is a schematic diagram of an illustrative device that includes a first virtual machine executed by a first physical module and a second virtual machine 120B executed by a second physical module, in accordance with at least one embodiment described herein.

FIG. 3A provides a schematic diagram of an illustrative device 300 that includes a first virtual machine 120A executed by a first physical module 112A and a second virtual machine 120B executed by a second physical module 112B, in accordance with at least one embodiment described herein. The first virtual machine 120A executes one or more applications 310A using a number of virtual CPUs 122A and 122B. The second virtual machine 120B executes one or more applications 310B using a number of virtual CPUs 122A and 122B. The first physical module 112A includes a first physical core 114A and a second physical core 114B that provide virtual CPU 122A and virtual CPU 122B, respectively. The first physical module 112A also includes a cache 116A and cache 116B, communicably coupled to the first physical core 114A and to the second physical core 114B, respectively. The physical cores 114A and 114B share a level 3 (L3) cache 330. The second physical module 112B includes a first physical core 114A and a second physical core 114B that provide virtual CPU 122A and virtual CPU 122B, respectively. The second physical module 112B also includes a cache 116A and cache 116B, communicably coupled to the first physical core 114A and to the second physical core 114B, respectively. The physical cores 114A and 114B share a level 3 cache 330. Modules 112A and 112B share a common memory 340 and the virtual machine manager 102.

As depicted in FIG. 3A, the performance monitoring circuitry 230 determines one or more values indicative of one or more parameters associated with virtual CPU 122A, such as CPU utilization 322A for virtual machine 120A which is shown as an illustrative shaded bar in virtual CPU 122A. The performance monitoring circuitry 230 determines one or more values representative of one or more parameters associated with virtual CPU 122B, such as CPU utilization 322B for virtual machine 120A which is shown as an illustrative shaded bar in virtual CPU 122B. The performance monitoring circuitry 230 also determines one or more values indicative of one or more parameters associated with virtual CPU 122B, such as CPU utilization 322C for virtual machine 120B which is shown as an illustrative shaded bar in virtual CPU 122A. The performance monitoring circuitry 230 determines one or more values representative of one or more parameters associated with virtual CPU 122B, such as CPU utilization 322D for virtual machine 120B which is shown as an illustrative shaded bar in virtual CPU 122B. Some or all of the determined values indicative of the performance of virtual machine 120A and virtual machine 120B may be communicated via one or more signals 232 to the performance determination circuitry 240. Some or all of the determined values indicative of the performance of virtual machine 120A and virtual machine 120B may be communicated via one or more signals 234 to the power management circuitry 270.

As depicted in FIG. 3A, the resource monitoring circuitry 250 determines one or more values indicative of one or more parameters associated with physical core 114A, such as core utilization 324A (shown as an illustrative shaded bar in core 114A) of module 112A. The resource monitoring circuitry 250 determines one or more values representative of one or more parameters associated with physical core 114B, such as core utilization 324B (shown as an illustrative shaded bar in core 114B) of module 112A. The resource monitoring circuitry 250 also determines one or more values indicative of one or more parameters associated with physical core 114A, such as core utilization 324C (shown as an illustrative shaded bar in core 114A) of module 112B. The resource monitoring circuitry 250 also determines one or more values representative of one or more parameters associated with physical core 114B, such as core utilization 324D (shown as an illustrative shaded bar in core 114B) of module 112B. The resource monitoring circuitry 250 communicates some or all of the determined values indicative of the performance of physical cores 114 in modules 112A and 112B via one or more signals 252 to the resource allocation determination circuitry 260. The resource monitoring circuitry 250 communicates some or all of the determined values indicative of the performance of physical cores 114 in modules 112A and 112B via one or more signals 254 to the power management circuitry 270.

As depicted in FIG. 3A, the resource monitoring circuitry 250 determines one or more values indicative of one or more parameters associated with cache 116A, such as cache utilization 326A (shown as an illustrative shaded bar in cache 116A) of module 112A. The resource monitoring circuitry 250 also determines one or more values representative of one or more parameters associated with cache 116B, such as cache utilization 326B (shown as an illustrative shaded bar in cache 116B) of module 112A. The resource monitoring circuitry 250 further determines one or more values indicative of one or more parameters associated with cache 116A, such as cache utilization 326C (shown as an illustrative shaded bar in cache 116A) of module 112B. The resource monitoring circuitry 250 further determines one or more values representative of one or more parameters associated with cache 116B, such as cache utilization 326D (shown as an illustrative shaded bar in cache 116B) of module 112B. The resource monitoring circuitry 250 communicates some or all of the determined values indicative of the performance of caches 116 in modules 112A and 112B via one or more signals 252 to the resource allocation determination circuitry 260. The resource monitoring circuitry 250 may communicate some or all of the determined values indicative of the performance of caches 116 in modules 112A and 112B via one or more signals 254 to the power management circuitry 270.

Figure 3B:
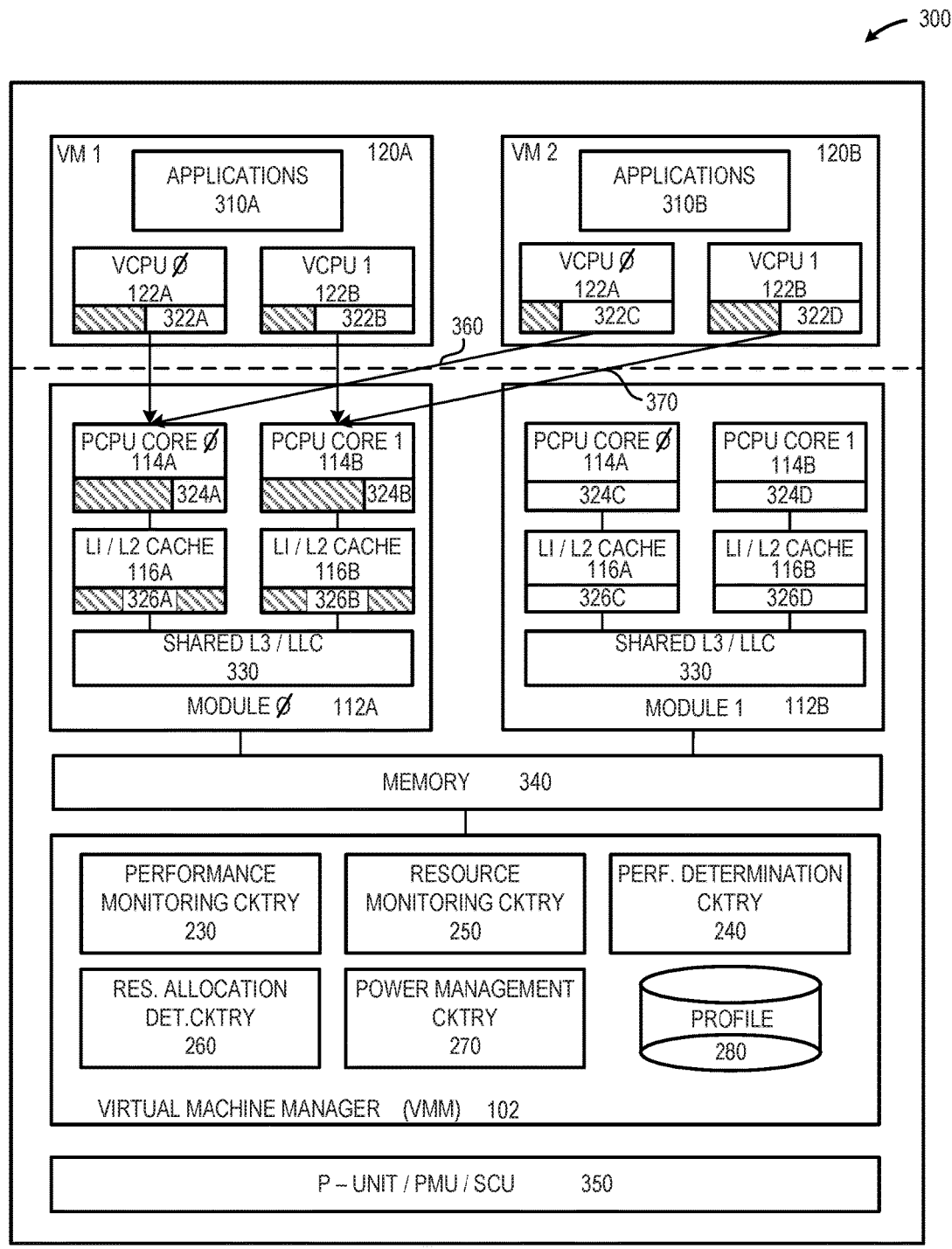
FIG. 3B is a schematic diagram of the illustrative device depicted in FIG. 3A, and in which the first virtual machine and the second virtual machine have been consolidated to physical module, thereby freeing physical resources (e.g., cores and caches) on physical module, in accordance with at least one embodiment described herein.

FIG. 3B provides a schematic diagram of the illustrative device 300 depicted in FIG. 3A, and in which the first virtual machine 120A and the second virtual machine 120B have been consolidated to physical module 112A, thereby freeing physical resources (e.g., cores 114 and caches 116) on physical module 112B, in accordance with at least one embodiment described herein.

As depicted in FIG. 3B, the performance determination circuitry 240 may determine a power savings may be realized by consolidating physical resources used to support virtual machine 120B with the physical resources used to support virtual machine 120A. Using received resource parameters such as core utilization 324A-324D, the resource allocation determination circuitry 260 may determine that consolidation of the physical cores 114 in the second module 112B with the physical cores 114 in the first module 112A does not violate one or more resource allocation policies stored on the storage device 280. Using received resource parameters such as cache utilization 326A-326D, the resource allocation determination circuitry 260 may determine that consolidation of physical caches 116 in the second module 112B with physical caches 116 in the first module 112A does not violate one or more resource allocation policies stored on the storage device 280.

Based on the power savings determined by the performance determination circuitry 240 and the compliance with resource allocation policies determined by resource allocation determination circuitry 260, the power management circuitry 270 may consolidate the physical CPU load imposed on virtual CPU 122A in virtual machine 120B and the physical CPU load imposed on virtual CPU 122A in virtual machine 120A on physical core 114A in module 112A. Based on the power savings determined by the performance determination circuitry 240 and the compliance with resource allocation policies determined by resource allocation determination circuitry 260, the power management circuitry 270 may consolidate 260 the physical CPU load imposed on virtual CPU 122B in virtual machine 120B and the physical CPU load imposed on virtual CPU 122B in virtual machine 120A on physical core 114B in module 112A.

Based on the power savings determined by the performance determination circuitry 240 and the compliance with resource allocation policies determined by resource allocation determination circuitry 260, the power management circuitry 270 may consolidate 270 the physical cache load imposed by virtual CPU 122A in virtual machine 120B and the physical cache load imposed by virtual CPU 122A in virtual machine 120A on physical cache 116A in module 112A. Based on the power savings determined by the performance determination circuitry 240 and the compliance with resource allocation policies determined by resource allocation determination circuitry 260, the power management circuitry 270 may consolidate the physical cache load imposed by virtual CPU 122B in virtual machine 120B and the physical cache load imposed by virtual CPU 122B in virtual machine 120A on physical cache 116B in module 112A.

Consolidation 260 of the physical CPU load imposed by virtual CPU 122A in virtual machine 120B on physical core 114A in module 112B beneficially reduces or even eliminates the power consumption imposed on the system 300 by physical core 114A. Similarly, consolidation 270 of the physical CPU load imposed by virtual CPU 122B in virtual machine 120B on physical core 114B in module 112B beneficially reduces or even eliminates the power consumption imposed on the system 300 by physical core 114B. Consolidation 260 of the physical cache load imposed by virtual CPU 122A in virtual machine 120B on physical cache 116A in module 112B beneficially reduces or even eliminates the power consumption imposed on the system 300 by physical cache 116A. Similarly, consolidation 270 of the physical CPU load imposed by virtual CPU 122B in virtual machine 120B on physical cache 116B in module 112B beneficially reduces or even eliminates the power consumption imposed on the system 300 by physical cache 116B.

Figure 4:
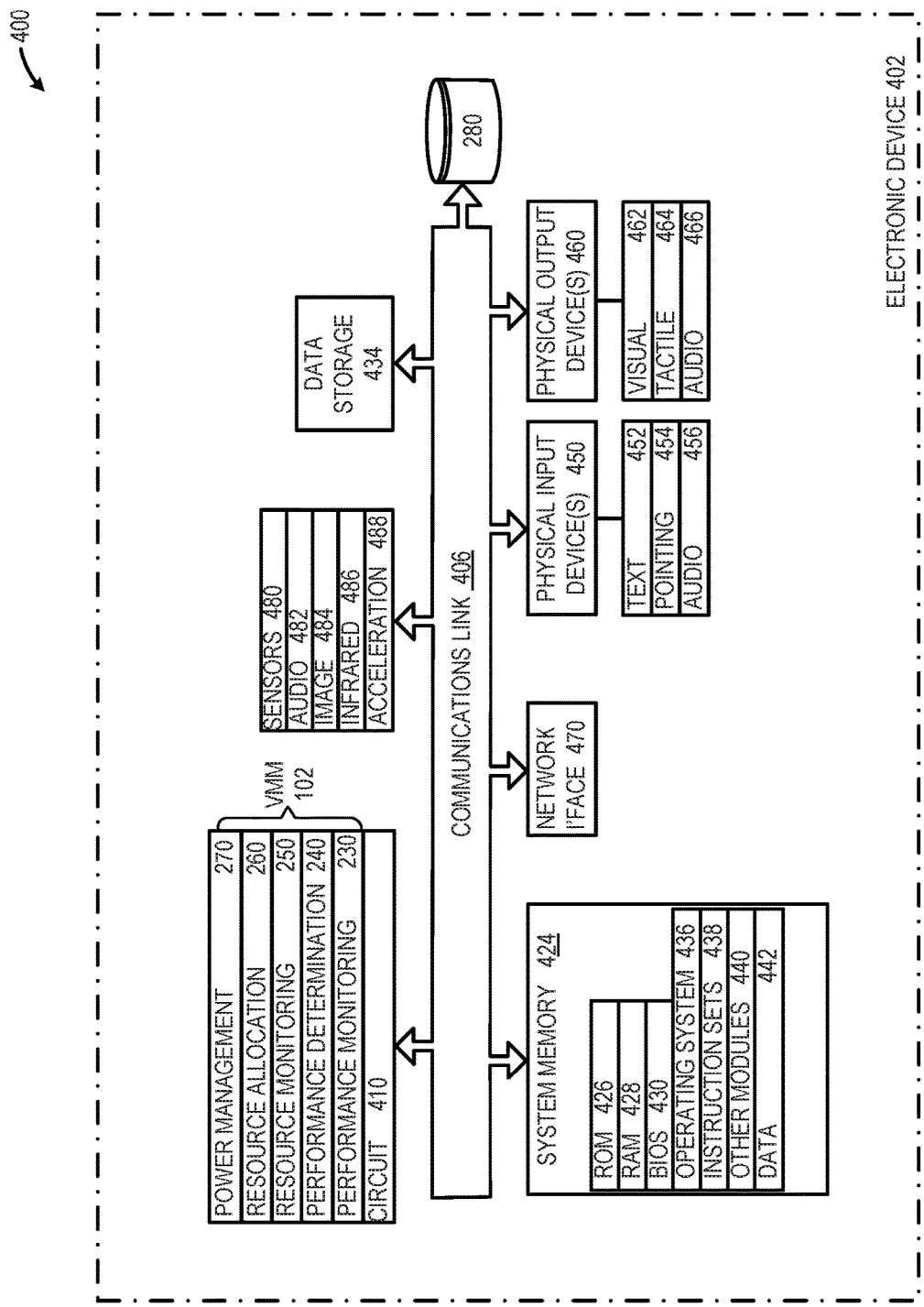
FIG. 4 and the following discussion provide a brief, general description of the components forming an illustrative system that includes one or more virtual machine managers capable of consolidating loads across multiple physical resource modules associated with multiple virtual machines to a fewer number of physical resource modules, in accordance with at least one embodiment described herein.

FIG. 4 and the following discussion provide a brief, general description of the components forming an illustrative system 400 that includes one or more virtual machine managers 102 capable of consolidating loads across multiple physical resource modules 112 associated with multiple virtual machines 120 to a fewer number of physical resource modules 112, in accordance with at least one embodiment described herein. Some embodiments may include machine-readable or computer-executable instruction sets, such as program application modules, objects, or macros being executed by the virtual machine manager 102. Some embodiments may include circuitry implemented in the form of hard-wired circuitry, semiconductor circuitry, microprocessors, controllers, or similar devices that provide the various components or modules forming the virtual machine manager 102 including, but not limited to, performance monitoring circuitry 230, the performance determination circuitry 240, the resource monitoring circuitry 250, the resource allocation determination circuitry 260, the power management circuitry 270, and the like.

Those skilled in the relevant art will appreciate that the illustrated embodiments as well as other embodiments can be practiced with other circuit-based device configurations, including portable electronic or handheld electronic devices, for instance smartphones, portable computers, wearable computers, microprocessor-based or programmable consumer electronics, personal computers ("PCs"), network PCs, minicomputers, mainframe computers, and the like. The embodiments can be practiced in distributed computing environments where tasks or modules are performed by remote processing devices, which are linked through a communications network. In a distributed computing environment, program modules may be located in both local and remote memory storage devices.

The system 402 may include any number of circuits 410, each of which may include a variety of electronic and/or semiconductor components that are disposed partially or wholly in a wearable computer, portable computing device, personal digital assistant, personal computer, or other similar current or future processor-based devices and/or systems capable of executing machine-readable instructions. The one or more circuits 410 may be interconnected with, electrically coupled, and/or communicably coupled to various components within the portable device 402 via one or more communications links 406. As depicted in FIG. 4, all or a portion of the one or more circuits 410 may be apportioned or allocated to the performance monitoring circuitry 230, the performance determination circuitry 240, the resource monitoring circuitry 250, the resource allocation determination circuitry 260, and/or the power management circuitry 270.

As depicted in FIG. 4, system components such as a system memory 424 may be communicably coupled to the one or more circuits 410 via the one or more communications links 406. The device 402 may, at times, be referred to in the singular herein, but this is not intended to limit the embodiments to a single system, since in certain embodiments, there will be more than device 402 or other networked systems, circuits, or devices involved.

The one or more circuits 410 may include any number, type, or combination of conductors, insulators, electrical devices, and/or semiconductor components. At times, the one or more circuits 410 may be implemented in whole or in part in the form of semiconductor devices such as diodes, transistors, inductors, capacitors, and resistors. Such an implementation may include, but is not limited to any current or future developed single- or multi-core processor or microprocessor, such as: one or more systems on a chip (SOCs); one or more central processing units (CPUs); one or more digital signal processors (DSPs); one or more graphics processing units (GPUs); one or more application-specific integrated circuits (ASICs), one or more field programmable gate arrays (FPGAs), and the like. Unless described otherwise, the construction and operation of the various blocks shown in FIG. 4 are of conventional design. As a result, such blocks need not be described in further detail herein, as they will be understood by those skilled in the relevant art. The one or more communications links 406 that interconnects at least some of the components may employ any known serial or parallel bus structures or architectures.

The system memory 424 may include read-only memory ("ROM") 426 and random access memory ("RAM") 428. A portion of the ROM 426 may contain a basic input/output system ("BIOS") 430. The BIOS 430 may provide basic functionality to the device 402. For example, by causing, in some implementations, the one or more circuits 410 to load one or more machine-readable instruction sets that cause the one or more circuits 410 to provide and function as a particular and specialized virtual machine manager 102. In another example, the BIOS 430 may cause a general purpose circuit 410, processor, microprocessor, or similar device to execute machine-readable instruction sets that cause the transformation of at least a portion of the circuit 310 into one or more specialized or particular machines and/or circuitry such as the performance monitoring circuitry 230, performance determination circuitry 240, resource monitoring circuitry 250, resource allocation determination circuitry 260, and/or power management circuitry 270.

The device 402 may include one or more communicably coupled, non-transitory, data storage devices 280. The one or more data storage devices 280 may include any number and/or combination of any current or future developed non-transitory storage devices and/or memory. Non-limiting examples of such non-transitory, data storage devices 280 may include, but are not limited to one or more magnetic storage devices, one or more optical storage devices, one or more solid-state electromagnetic storage devices, one or more electroresistive storage devices, one or more molecular storage devices, one or more quantum storage devices, or various combinations thereof.

The one or more storage devices 280 may include interfaces or controllers (not shown) communicatively coupling the respective storage device(s) 280 to the one or more communications links 406, as is known by those skilled in the art. The one or more storage devices 280 may contain machine-readable instruction sets, data structures, program modules, and other data useful to the device 402.

In some instances, one or more external storage devices (not shown in FIG. 4) may be communicably coupled to the device 402. Such external storage devices may be local to the device 402 or remote from the device 402. In one example, the one or more external storage devices 330 may include one or more remote server based storage devices or "cloud" storage devices that are bi-directionally communicably coupled to the portable electronic device 122 via one or more networks, such as one or more wireless networks (e.g., IEEE 802.11 "Wi-Fi"), one or more wired networks (e.g., IEEE 802.3 "Ethernet"), or combinations thereof.

The portable electronic device 122 may include a number of sensors 480 that are communicably coupled to the virtual machine manager 102 via the one or more communications links 406. In some implementations, the sensors 480 may include some or all of: one or more audio input sensors 482 (e.g., one or more microphones or similar); one or more image sensors 484 (e.g., one or more charge coupled device (CCD) or complementary metal oxide semiconductor (CMOS) image sensors, ambient light level sensors, or similar); one or more infrared illuminators/infrared image acquisition sensors 486; one or more movement or motion based sensors 488, or combinations thereof. In at least some implementations, such sensors 480 may autonomously collect environmental data or information on a regular, irregular, periodic, or aperiodic basis.

Machine-readable instruction sets and/or applications 438 and housekeeping instruction sets 440 may be stored or otherwise retained in whole or in part in the system memory 424. Such instruction sets may be transferred from one or more storage devices 434 and/or one or more external storage devices and stored in the system memory 424 in whole or in part for execution by the one or more circuits 410. The machine-readable instruction sets 438 may include instructions and/or logic providing the semantic labeling functions and capabilities described herein.

For example, one or more applications 438 may cause the performance monitoring circuitry 230 to collect information and/or data representative of one or more performance parameters associated with some or all of the virtual machines 120 (virtual CPU utilization, virtual CPU frequency, etc.) and/or the applications executed by the virtual machines 120 (application performance, application execution speed, etc.). The one or more applications 438 may further cause the performance monitoring circuitry 230 to generate a signal 232, 234 that includes the collected information and/or data representative of one or more parameters associated with each of the virtual machines 120 and/or the applications executed by the virtual machines 120.

The one or more applications 438 may cause the performance determination circuitry 240 to receive the information and/or data from the performance monitoring circuitry 230 and determine, based at least in part on the received information and/or data, values indicative of the expected performance of the virtual machine 120 and/or application executed by the virtual machine 120 for the current operating regime or state and for one or more proposed operating regimes or states. The one or more applications 438 may additionally cause the performance determination circuitry 240 to determine, based at least in part on the received information and/or data, values indicative of the power consumption and/or physical resource requirements of the virtual machine 120 for the current operating regime or state and for one or more proposed operating regimes or states.

The one or more applications 438 may cause the resource monitoring circuitry 250 to collect information and/or data representative of one or more performance parameters associated with some or all of the physical cores 114 (core utilization, core frequency, etc.) and/or physical caches 116 (cache utilization, cache miss rate, cache hit rate, cache read/write rate, etc.). The one or more applications 438 may further cause the resource monitoring circuitry 250 to generate a signal 252, 254 that includes the collected information and/or data representative of one or more parameters associated with each of the physical cores 114 and/or physical caches 116.

The one or more applications 438 may cause the resource allocation determination circuitry 260 to receive the information and/or data from the resource monitoring circuitry 250 and determines, based at least in part on the received information and/or data, values indicative of the expected physical resource demand for the one or more proposed operating regimes or states in which the virtual machines 120 are consolidated to fewer physical modules 112 and/or resources.

The one or more applications 438 may cause the power management circuitry 270 to select an operating regime based at least in part on the information and/or data provided by the performance determination circuitry 240 and based at least in part on the information and/or data provided by the resource allocation determination circuitry 260. The one or more applications 438 may cause the power management circuitry 270 to generate one or more outputs that cause the consolidation of physical resources (e.g., physical cores and/or physical caches) within the device 402.

The device 402 may include one or more communicably coupled physical input devices 450, such as one or more text entry devices 452 (e.g., keyboard), one or more pointing devices 454 (e.g., mouse, trackball, touchscreen), and/or one or more audio input devices 456. Such physical input devices 450 may be used, for example, to provide, enter, or otherwise supply commands (e.g., acknowledgements, selections, confirmations, and similar) as well as information (e.g., acknowledgements, and similar) to the virtual machine manager 102. The device 402 may include one or more communicably coupled physical output devices 460, such as one or more visual output devices 462 (e.g., a display device), one or more tactile output devices 464 (e.g., haptic feedback or similar), one or more audio output devices 466, or any combination thereof.

For convenience, the network interface 470, the one or more circuits 410, the system memory 424, the physical input devices 450 and the physical output devices 460 are illustrated as communicatively coupled to each other via the one or more communications links 406, thereby providing connectivity between the above-described components. In alternative embodiments, the above-described components may be communicatively coupled in a different manner than illustrated in FIG. 4. For example, one or more of the above-described components may be directly coupled to other components, or may be coupled to each other, via one or more intermediary components (not shown). In some embodiments, the one or more communications links 406

Figure 5:
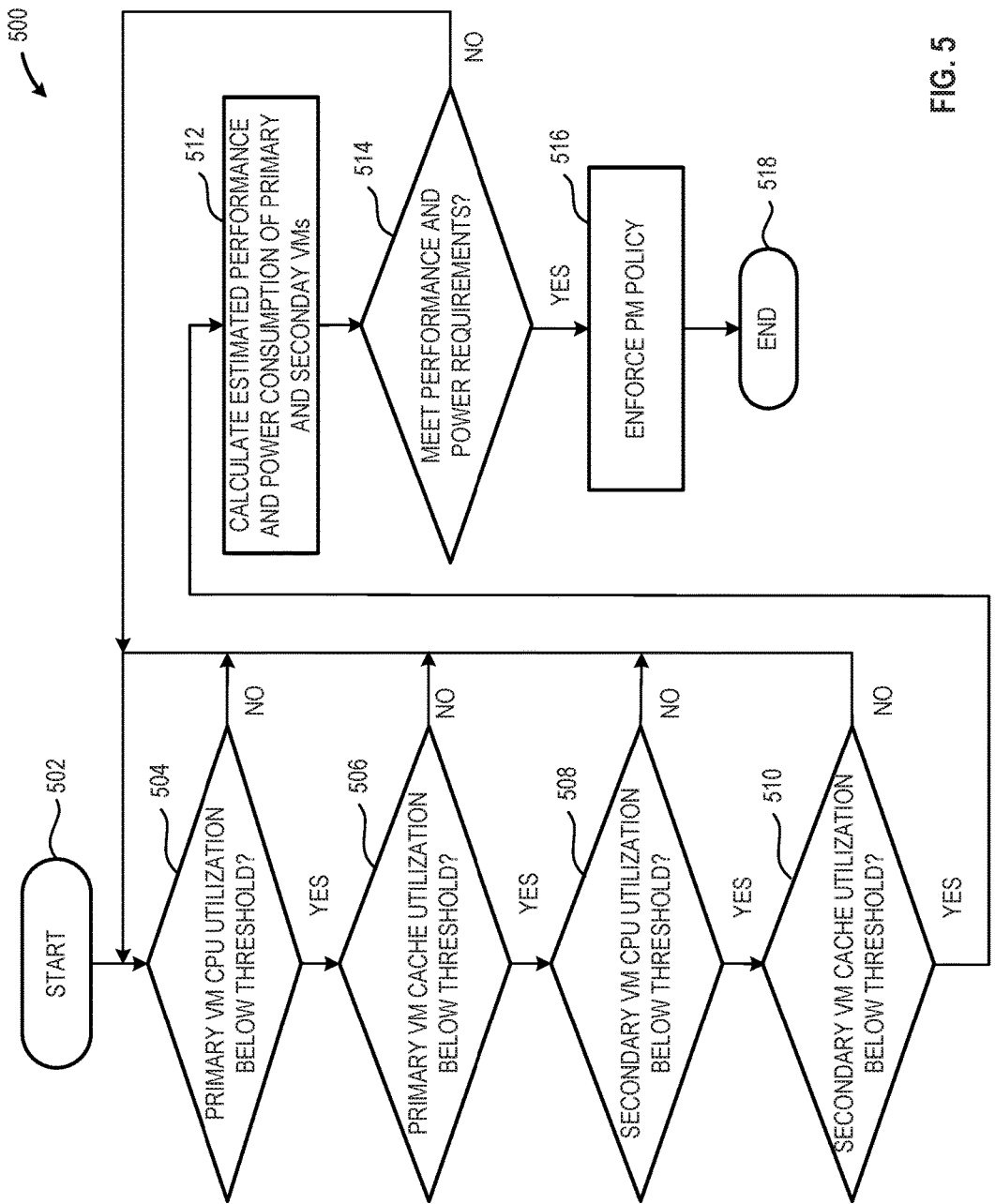
FIG. 5 is a high-level logic flow diagram of an illustrative method of consolidating the physical resources used by virtual machines, in accordance with at least one embodiment described herein.

FIG. 5 is a high-level logic flow diagram of an illustrative method 500 of consolidating the physical resources used by virtual machines 120, in accordance with at least one embodiment described herein. The virtual machine manager 102 considers physical core 114 parameters (e.g., physical core loading 324) and physical cache 116 parameters (e.g., physical cache loading 326) in making the determination to consolidate virtual machines 120. By considering both physical core loading and physical cache loading prior to consolidating physical resources, the virtual machine manager 102 beneficially minimizes the likelihood of cache pollution, cache errors, and cache data loss, thereby beneficially improving data reliability and consistency within the system 100. The method 500 commences at 502.

At 504, the resource monitoring circuitry 250 communicates information and/or data indicative of one or more physical core parameters to the resource allocation determination circuitry 260. In embodiments, the resource allocation determination circuitry 260 compares the received physical core parametric data to one or more defined threshold values to determine whether the physical core parameter is at or below a defined threshold value. In some implementations, the physical core parameter may include, but is not limited to, information and/or data indicative of the utilization of the physical core 114.

If the physical core parameter is above the defined threshold value (indicative of a high demand being placed on the respective core 114 by a first virtual machine 120A), the virtual machine manager 102 continues to monitor the physical core parameter at 504. If the physical core parameter is at or below the defined threshold value (indicative of a relatively low demand being placed on the respective core 114 by the first virtual machine 120A), the virtual machine manager 102 proceeds to 506.

At 506, the resource monitoring circuitry 250 communicates information and/or data indicative of one or more physical cache parameters to the resource allocation determination circuitry 260. In embodiments, the resource allocation determination circuitry 260 compares the received physical cache parametric data to one or more defined threshold values to determine whether the physical cache parameter is at or below a defined threshold value. In some implementations, the physical cache parameter may include, but is not limited to, information and/or data indicative of the utilization of a physical cache 116.

If the physical cache parameter is above the defined threshold value (indicative of a high demand being placed on the respective cache 116 by the first virtual machine 120A), the virtual machine manager 102 continues to monitor the physical parameters commencing at 504. If the physical cache parameter is at or below the defined threshold value (indicative of a relatively low demand being placed on the respective cache 116 by the first virtual machine 120A), the virtual machine manager 102 proceeds to 508.

At 508, the resource monitoring circuitry 250 communicates information and/or data indicative of one or more physical core parameters to the resource allocation determination circuitry 260. In embodiments, the resource allocation determination circuitry 260 compares the received physical core parametric data to one or more defined threshold values to determine whether the physical core parameter is at or below a defined threshold value. In some implementations, the physical core parameter may include, but is not limited to, information and/or data indicative of the utilization of the physical core 114.

If the physical core parameter is above the defined threshold value (indicative of a high demand being placed on the respective core 114 by a second virtual machine 120B), the virtual machine manager 102 continues to monitor the physical core parameters commencing at 504. If the physical core parameter is at or below the defined threshold value (indicative of a relatively low demand being placed on the respective core 114 by the second virtual machine 120B), the virtual machine manager 102 proceeds to 510.

At 510, the resource monitoring circuitry 250 communicates information and/or data indicative of one or more physical cache parameters to the resource allocation determination circuitry 260. In embodiments, the resource allocation determination circuitry 260 compares the received physical cache parametric data to one or more defined threshold values to determine whether the physical cache parameter is at or below a defined threshold value. In some implementations, the physical cache parameter may include, but is not limited to, information and/or data indicative of the utilization of a physical cache 116.

If the physical cache parameter is above the defined threshold value (indicative of a high demand being placed on the respective cache 116 by the second virtual machine 120B), the virtual machine manager 102 continues to monitor the physical parameters commencing at 504. If the physical cache parameter is at or below the defined threshold value (indicative of a relatively low demand being placed on the respective cache 116 by the second virtual machine 120B), the virtual machine manager 102 proceeds to 512.

At 512, the performance determination circuitry 240 determines one or more values corresponding to an estimated performance and an estimated power consumption if the physical resources (i.e., the physical core(s) 114 and physical cache(s) 116) allocated to the second virtual machine 120B are consolidated with the physical resources (i.e., the physical core(s) 114 and physical cache(s) 116) allocated to the first virtual machine 120A.

At 514, the resource allocation determination circuitry 260 determines whether the estimated performance and estimated power consumption determined by the performance determination circuitry 240 at 512 meets one or more threshold values to proceed with consolidating the physical resources used by the first virtual machine 120A with the physical resources used by the second virtual machine 120B. If the estimated performance and the estimated power consumption meet the one or more threshold values, the method proceeds to 516, if the estimated performance and the estimated power consumption fail to meet the one or more threshold values the virtual machine manager 102 continues to monitor the physical core parameters commencing at 504.

At 516, the virtual machine manager 102 enforces the power consumption policy by combining the physical resources (i.e., the physical core(s) 114 and the physical cache(s) 116) used by the first virtual machine 120A and by the second virtual machine 120B. The method concludes at 518.

While FIG. 5 illustrates an operation according to one embodiment, it is to be understood that not all of the operations depicted in FIG. 5 are necessary for other embodiments. Indeed, it is fully contemplated herein that in other embodiments of the present disclosure, the operations depicted in FIG. 5, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

Additionally, operations for the embodiments have been further described with reference to the above figures and accompanying examples. Some of the figures may include a logic flow. Although such figures presented herein may include a particular logic flow, it can be appreciated that the logic flow merely provides an example of how the general functionality described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited to this context.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. Thus, the breadth and scope of the present invention should not be limited by any of the above-described exemplary embodiments, but should be defined only in accordance with the following claims and their equivalents.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), magnetic or optical cards, or any type of media suitable for storing electronic instructions. Other embodiments may be implemented as software modules executed by a programmable control device. The storage medium may be non-transitory.

According to example 1, there is provided a performance monitoring system for virtual machines. The system may include performance monitoring circuitry to determine performance data indicative of at least one parameter logically associated with each of a plurality of virtual machines; resource monitoring circuitry to determine resource data indicative of: at least one physical core parameter logically associated with each of a plurality of physical cores and at least one physical cache parameter; and at least physical cache parameter logically associated with each of a plurality of physical caches, each of the physical caches communicably coupled to a respective one of the plurality of physical cores; and power management circuitry to determine whether to consolidate at least two of the plurality of virtual machines based, at least in part, on the determined performance data and the determined resource data.

Example 2 may include elements of example 1 and may additionally include performance determination circuitry communicably coupled to the performance monitoring circuitry and to the power management circuitry, the performance determination circuitry to: determine a value indicative of a performance parameter for each of the plurality of virtual machines based at least in part on the determined performance data; and communicate the determined value indicative of the performance parameter for each of the plurality of virtual machines to the power management circuitry.

Example 3 may include elements of example 2 where the performance determination circuitry may determine a value indicative of a performance parameter for each of the plurality of virtual machines based at least in part on virtual CPU utilization data logically associated with each of at least some of the plurality of virtual machines.

Example 4 may include elements of example 1 and may additionally include resource allocation determination circuitry communicably coupled to the resource monitoring circuitry and to the power management circuitry, the resource allocation determination circuitry to: determine a value indicative of a physical resource allocation for each of the plurality of virtual machines based at least in part on the determined resource data; and communicate the determined value indicative of the physical resource allocation for each of the plurality of virtual machines to the power management circuitry.

Example 5 may include elements of example 4 and may additionally include at least one storage device communicably coupled to the resource allocation determination circuitry, the at least one storage device having data representative of one or more resource allocation policies stored thereon.

Example 6 may include elements of example 5 where the resource allocation determination circuitry determines the value indicative of a physical resource allocation for each of the plurality of virtual machines based at least in part on the one or more resource allocation policies stored on the at least one storage device.

Example 7 may include elements of example 1 where the performance monitoring circuitry determines performance data that includes virtual CPU utilization data logically associated with at least some of the plurality of virtual machines.

Example 8 may include elements of example 1 where the resource monitoring circuitry generates resource data indicative of physical core utilization data logically associated with at least some of the plurality of physical cores and physical cache utilization data logically associated with at least some of the plurality of physical caches.

Example 9 may include elements of example 1 where the resource monitoring circuitry generates resource data indicative of a memory utilization trend logically associated with at least some of the plurality of physical caches.

According to example 10, there is provided a processor-based device that includes a performance monitoring system. The system may include at least one central processing unit (CPU) that includes a plurality physical cores, each of the plurality of physical cores communicably coupled to a respective one of a plurality of physical caches; and a performance monitoring system for virtual machines, comprising: performance monitoring circuitry to determine performance data indicative of at least one parameter logically associated with each of a plurality of virtual machines; resource monitoring circuitry to determine resource data indicative of: at least one physical core parameter logically associated with each of a plurality of physical cores and at least one physical cache parameter; and at least physical cache parameter logically associated with each of a plurality of physical caches, each of the physical caches communicably coupled to a respective one of the plurality of physical cores; and power management circuitry to determine whether to consolidate at least two of the plurality of virtual machines based, at least in part, on the determined performance data and the determined resource data.

Example 11 may include elements of example 10 where the performance monitoring system may further include performance determination circuitry communicably coupled to the performance monitoring circuitry and to the power management circuitry, the performance determination circuitry to: determine a value indicative of a performance parameter for each of the plurality of virtual machines based at least in part on the determined performance data; and communicate the determined value indicative of the performance parameter for each of the plurality of virtual machines to the power management circuitry.

Example 12 may include elements of example 11 where the performance determination circuitry to: determine a value indicative of a performance parameter for each of the plurality of virtual machines based at least in part on virtual CPU utilization data logically associated with each of at least some of the plurality of virtual machines.

Example 13 may include elements of example 10 where the performance monitoring system may additionally include resource allocation determination circuitry communicably coupled to the resource monitoring circuitry and to the power management circuitry, the resource allocation determination circuitry to: determine a value indicative of a physical resource allocation for each of the plurality of virtual machines based at least in part on the determined resource data; and communicate the determined value indicative of the physical resource allocation for each of the plurality of virtual machines to the power management circuitry.

Example 14 may include elements of example 13 and may additionally include at least one storage device communicably coupled to the resource allocation determination circuitry, the at least one storage device having data representative of one or more resource allocation policies stored thereon.

Example 15 may include elements of example 14 where the resource allocation determination circuitry determines the value indicative of a physical resource allocation for each of the plurality of virtual machines based at least in part on the one or more resource allocation policies stored on the at least one storage device.

Example 16 may include elements of example 10 where the performance monitoring circuitry determines performance data that includes virtual CPU utilization data logically associated with at least some of the plurality of virtual machines.

Example 17 may include elements of example 10 where the resource monitoring circuitry generates resource data indicative of physical core utilization data logically associated with at least some of the plurality of physical cores and physical cache utilization data logically associated with at least some of the plurality of physical caches.

Example 18 may include elements of example 10 where the resource monitoring circuitry generates resource data indicative of a memory utilization trend logically associated with at least some of the plurality of physical caches.

According to example 19, there is provided a performance monitoring method to consolidate a plurality of virtual machines on a plurality of physical cores, each communicably coupled to a respective one of a corresponding plurality of physical caches. The method may include determining, by performance monitoring circuitry, performance data indicative of at least one parameter logically associated with each of a plurality of virtual machines; determining, by resource monitoring circuitry, resource data indicative of: at least one physical core parameter logically associated with each of the plurality of physical cores; and at least physical cache parameter logically associated with each of the plurality of physical caches, each of the physical caches communicably coupled to a respective one of the plurality of physical cores; and determining, by power management circuitry, whether to consolidate at least two of the plurality of virtual machines based, at least in part, on the determined performance data and the determined resource data.

Example 20 may include elements of example 19 where determining performance data indicative of at least one parameter logically associated with each of a plurality of virtual machines may include: determining, by performance determination circuitry communicably coupled to the performance monitoring circuitry, a value indicative of a performance parameter for each of the plurality of virtual machines based at least in part on the determined performance data; and communicating the determined value indicative of the performance parameter for each of the plurality of virtual machines to the power management circuitry.

Example 21 may include elements of example 20 where determining a value indicative of a performance parameter for each of the plurality of virtual machines may include: determining, by the performance monitoring circuitry, virtual CPU utilization data logically associated with each of at least some of the plurality of virtual machines.

Example 22 may include elements of example 19, and may additionally include determining, by resource allocation determination circuitry communicably coupled to the resource monitoring circuitry, a value indicative of a physical resource allocation for each of the plurality of virtual machines based at least in part on the determined resource data; and communicating the determined value indicative of the physical resource allocation for each of the plurality of virtual machines to the power management circuitry.

Example 23 may include elements of example 22, and may additionally include retrieving, by the resource allocation determination circuitry from at least one communicably coupled storage device, data representative of one or more resource allocation policies.

Example 24 may include elements of example 23 where determining a value indicative of a physical resource allocation for each of the plurality of virtual machines based at least in part on the determined resource allocation data may include: determining, by the resource allocation determination circuitry, a value indicative of a physical resource allocation for each of the plurality of virtual machines based at least in part on the determined resource allocation data and based at least in part on the one or more resource allocation policies.

Example 25 may include elements of example 19 where determining resource data indicative of at least a physical cache parameter logically associated with each of a plurality of physical caches may include: determining, by resource allocation determination circuitry communicably coupled to the resource monitoring circuitry and to the power management circuitry, a value indicative of a physical cache utilization trend logically associated with at least some of the plurality of physical caches; and communicating the determined value indicative of the physical cache utilization trend to the power management circuitry.

Example 26 may include elements of example 19 where determining resource data indicative of at least at least one physical core parameter logically associated with each of a plurality of physical cores may include: determining, by resource allocation determination circuitry communicably coupled to the resource monitoring circuitry and to the power management circuitry, a value indicative of a physical core utilization logically associated with at least some of the plurality of physical cores; and communicating the determined value indicative of the physical core utilization to the power management circuitry.

Example 27 may include elements of example 19 where determining resource data indicative of at least at least one physical core parameter logically associated with each of a plurality of physical cores may include: determining, by resource allocation determination circuitry communicably coupled to the resource monitoring circuitry and to the power management circuitry, a value indicative of a physical core utilization logically associated with at least some of the plurality of physical cores; and communicating the determined value indicative of the physical core utilization to the power management circuitry.

Example 28 may include elements of example 19 where determining resource data indicative of at least at least one physical core parameter logically associated with each of a plurality of physical cores may include: determining, by resource allocation determination circuitry communicably coupled to the resource monitoring circuitry and to the power management circuitry, a value indicative of a physical core utilization trend logically associated with at least some of the plurality of physical cores; and communicating the determined value indicative of the physical core utilization trend to the power management circuitry.

According to example 29, there is provided a performance monitoring system to consolidate a plurality of virtual machines on a plurality of physical cores, each communicably coupled to a respective one of a corresponding plurality of physical caches. The system may include a means for determining performance data indicative of at least one parameter logically associated with each of a plurality of virtual machines; a means for determining resource data indicative of: at least one physical core parameter logically associated with each of the plurality of physical cores; and at least physical cache parameter logically associated with each of the plurality of physical caches, each of the physical caches communicably coupled to a respective one of the plurality of physical cores; and a means for determining whether to consolidate at least two of the plurality of virtual machines based, at least in part, on the determined performance data and the determined resource data.

Example 30 may include elements of example 29 where the means for determining performance data indicative of at least one parameter logically associated with each of a plurality of virtual machines may include a means for determining a value indicative of a performance parameter for each of the plurality of virtual machines based at least in part on the determined performance data; and a means for communicating to the power management circuitry the determined value indicative of the performance parameter for each of the plurality of virtual machines.

Example 31 may include elements of example 30 where the means for determining a value indicative of a performance parameter for each of the plurality of virtual machines may include a means for determining virtual CPU utilization data logically associated with each of at least some of the plurality of virtual machines.

Example 32 may include elements of example 29 and may additionally include a means for determining, by resource allocation determination circuitry communicably coupled to the resource monitoring circuitry, a value indicative of a physical resource allocation for each of the plurality of virtual machines based at least in part on the determined resource data; and a means for communicating the determined value indicative of the physical resource allocation for each of the plurality of virtual machines to the power management circuitry.

Example 33 may include elements of example 32, and may additionally include a means for retrieving, by the resource allocation determination circuitry from at least one communicably coupled storage device, data representative of one or more resource allocation policies.

Example 34 may include elements of example 33 where determining a value indicative of a physical resource allocation for each of the plurality of virtual machines based at least in part on the determined resource allocation data may include determining, by the resource allocation determination circuitry, a value indicative of a physical resource allocation for each of the plurality of virtual machines based at least in part on the determined resource allocation data and based at least in part on the one or more resource allocation policies.

Example 35 may include elements of example 29 where the means for determining resource data indicative of at least a physical cache parameter logically associated with each of a plurality of physical caches may include: a means for determining, by resource allocation determination circuitry communicably coupled to the resource monitoring circuitry and to the power management circuitry, a value indicative of a physical cache utilization trend logically associated with at least some of the plurality of physical caches; and a means for communicating to the power management circuitry the determined value indicative of the physical cache utilization trend.

Example 36 may include elements of example 29 where the means for determining resource data indicative of at least at least one physical core parameter logically associated with each of a plurality of physical cores may include a means for determining a value indicative of a physical core utilization logically associated with at least some of the plurality of physical cores; and a means for communicating the determined value indicative of the physical core utilization to the power management circuitry.

Example 37 may include elements of example 29 where the means for determining resource data indicative of at least at least one physical core parameter logically associated with each of a plurality of physical cores may include: a means for determining a value indicative of a physical core utilization logically associated with at least some of the plurality of physical cores; and a means for communicating the determined value indicative of the physical core utilization to the power management circuitry.

Example 38 may include elements of example 29 where the means for determining resource data indicative of at least at least one physical core parameter logically associated with each of a plurality of physical cores may include: a means for determining, by resource allocation determination circuitry communicably coupled to the resource monitoring circuitry and to the power management circuitry, a value indicative of a physical core utilization trend logically associated with at least some of the plurality of physical cores; and a means for communicating the determined value indicative of the physical core utilization trend to the power management circuitry.

According to example 39, there is provided a storage device that includes one or more machine readable instruction sets, that when executed by circuitry, cause the circuitry to transform to a virtual machine manager, the virtual machine manager to: cause performance monitoring circuitry to determine performance data indicative of at least one parameter logically associated with each of a plurality of virtual machines; cause resource monitoring circuitry to determine resource data indicative of: at least one physical core parameter logically associated with each of a plurality of physical cores; and at least physical cache parameter logically associated with each of a plurality of physical caches, each of the physical caches communicably coupled to a respective one of the plurality of physical cores; and cause power management circuitry to determine whether to consolidate at least two of the plurality of virtual machines based, at least in part, on the determined performance data and the determined resource data.

Example 40 may include elements of example 39 where the machine readable instructions that cause the performance monitoring circuitry to determine performance data indicative of at least one parameter logically associated with each of a plurality of virtual machines further cause the virtual machine manager to: cause performance determination circuitry communicably coupled to the performance monitoring circuitry to determine a value indicative of a performance parameter for each of the plurality of virtual machines based at least in part on the determined performance data; and cause the performance determination circuitry to communicate the determined value indicative of the performance parameter for each of the plurality of virtual machines to the power management circuitry.

Example 41 may include elements of example 40 where the machine readable instructions that cause the performance monitoring circuitry to determine performance data indicative of at least one parameter logically associated with each of a plurality of virtual machines further cause the virtual machine manager to: cause the performance monitoring circuitry to determine virtual CPU utilization data logically associated with each of at least some of the plurality of virtual machines.

Example 42 may include elements of example 39 where the machine readable instructions cause the virtual machine manager to further: cause resource allocation determination circuitry communicably coupled to the resource monitoring circuitry to determine a value indicative of a physical resource allocation for each of the plurality of virtual machines based at least in part on the determined resource data; and cause the resource allocation determination circuitry to communicate to the power management circuitry the determined value indicative of the physical resource allocation for each of the plurality of virtual machines.

Example 43 may include elements of example 42 where the machine readable instructions cause the virtual machine manager to further: cause the resource allocation determination circuitry to retrieve from at least one communicably coupled storage device, data representative of one or more resource allocation policies.

Example 44 may include elements of example 43 where the machine readable instructions that cause the resource allocation determination circuitry to determine a value indicative of a physical resource allocation for each of the plurality of virtual machines based at least in part on the determined resource allocation data further cause the resource allocation determination circuitry to further: determine a value indicative of a physical resource allocation for each of the plurality of virtual machines based at least in part on the determined resource allocation data and based at least in part on the one or more resource allocation policies.

Example 45 may include elements of example 39 where the machine readable instructions that cause the virtual machine manager to cause the resource monitoring circuitry to determine resource data indicative of at least a physical cache parameter logically associated with each of a plurality of physical caches further cause the virtual machine manager to: cause resource allocation determination circuitry communicably coupled to the resource monitoring circuitry and to the power management circuitry to determine a value indicative of a physical cache utilization trend logically associated with at least some of the plurality of physical caches; and cause the resource allocation determination circuitry to communicate the determined value indicative of the physical cache utilization trend to the power management circuitry.

Example 46 may include elements of example 39 where the machine readable instructions that cause the virtual machine manager to cause the resource monitoring circuitry to determine resource data indicative of at least at least one physical core parameter logically associated with each of a plurality of physical cores further cause the virtual machine manager to: cause resource allocation determination circuitry communicably coupled to the resource monitoring circuitry and to the power management circuitry to determine a value indicative of a physical core utilization logically associated with at least some of the plurality of physical cores; and cause the resource allocation determination circuitry to communicate the determined value indicative of the physical core utilization to the power management circuitry.

Example 47 may include elements of example 39 where the machine readable instructions that cause the virtual machine manager to cause the resource monitoring circuitry to determine resource data indicative of at least at least one physical core parameter logically associated with each of a plurality of physical cores further cause the virtual machine manager to: cause resource allocation determination circuitry communicably coupled to the resource monitoring circuitry and to the power management circuitry to determine a value indicative of a physical core utilization logically associated with at least some of the plurality of physical cores; and cause the resource allocation determination circuitry to communicate the determined value indicative of the physical core utilization to the power management circuitry.

Example 48 may include elements of example 39 where the machine readable instructions that cause the virtual machine manager to cause the resource monitoring circuitry to determine resource data indicative of at least at least one physical core parameter logically associated with each of a plurality of physical cores further cause the virtual machine manager to: cause resource allocation determination circuitry communicably coupled to the resource monitoring circuitry and to the power management circuitry to determine a value indicative of a physical core utilization trend logically associated with at least some of the plurality of physical cores; and cause the resource allocation determination circuitry to communicate the determined value indicative of the physical core utilization trend to the power management circuitry.

According to example 49, there is provided a system for managing physical resources allocated to a plurality of virtual machines, the system being arranged to perform the method of any of examples 19 through 28.

According to example 50, there is provided a chipset arranged to perform the method of any of examples 19 through 28.

According to example 52, there is provided a machine readable medium comprising a plurality of instructions that, in response to be being executed on a computing device, cause the computing device to carry out the method according to any of examples 19 through 28.

According to example 53, there is provided a device configured to manage physical resources allocated to a plurality of virtual machines, the device being arranged to perform the method of any of examples 19 through 28.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:

1. A performance monitoring system for virtual machines, comprising:
    performance monitoring circuitry to determine performance data indicative of at least one parameter logically associated with each of a plurality of virtual machines;
    resource monitoring circuitry to determine resource data indicative of:
        at least one physical core parameter logically associated with each of a plurality of physical cores; and
        at least one physical cache parameter logically associated with each of a plurality of physical caches, each of the physical caches communicably coupled to a respective one of the plurality of physical cores; and
    power management circuitry to:
    determine whether at least two of the plurality of virtual machines can be consolidated in a first physical core included in the plurality of physical cores based on the at least one physical core parameter received from the resource monitoring circuitry:
    responsive to a successful determination that the at least two virtual machines can be consolidated in the first physical core based on the at least one physical core parameter, determine whether the at least two of the plurality of virtual machines can be consolidated in a first physical cache coupled to the first physical core based on the at least one physical cache parameter received from the resource monitoring circuitry, wherein the at least one physical cache parameter includes one or more of cache turnover or cache access time; and
    consolidate the at least two virtual machines on the first physical core responsive to a successful determination that:
        the at least two virtual machines can be consolidated in the first physical core based on the at least one physical core parameter; and
        the at least two of the plurality of virtual machines can be consolidated in a first physical cache based on the at least one physical cache parameter.

2. The performance monitoring system of claim 1, further comprising:
    performance determination circuitry communicably coupled to the performance monitoring circuitry and to the power management circuitry, the performance determination circuitry to:
        determine a value indicative of a performance parameter for each of the plurality of virtual machines based at least in part on the determined performance data; and
        communicate the determined value indicative of the performance parameter for each of the plurality of virtual machines to the power management circuitry.

3. The performance monitoring system of claim 2 wherein the performance determination circuitry to:
    determine a value indicative of a performance parameter for each of the plurality of virtual machines based at least in part on virtual CPU utilization data logically associated with each of at least some of the plurality of virtual machines.

4. The performance monitoring system of claim 1, further comprising:

resource allocation determination circuitry communicably coupled to the resource monitoring circuitry and to the power management circuitry, the resource allocation determination circuitry to:

determine a value indicative of a physical resource allocation for each of the plurality of virtual machines based at least in part on the determined resource data; and communicate the determined value indicative of the physical resource allocation for each of the plurality of virtual machines to the power management circuitry.

5. The performance monitoring system of claim 4, further comprising at least one storage device communicably coupled to the resource allocation determination circuitry, the at least one storage device having data representative of one or more resource allocation policies stored thereon.

6. The performance monitoring system of claim 5 wherein the resource allocation determination circuitry determines the value indicative of a physical resource allocation for each of the plurality of virtual machines based at least in part on the one or more resource allocation policies stored on the at least one storage device.

7. The performance monitoring system of claim 1 wherein the performance monitoring circuitry determines performance data that includes virtual CPU utilization data logically associated with at least some of the plurality of virtual machines.

8. The performance monitoring system of claim 1 wherein the resource monitoring circuitry generates resource data indicative of physical core utilization data logically associated with at least some of the plurality of physical cores and physical cache utilization data logically associated with at least some of the plurality of physical caches.

9. The performance monitoring system of claim 1 wherein the resource monitoring circuitry generates resource data indicative of a memory utilization trend logically associated with at least some of the plurality of physical caches.

10. A performance monitoring method to consolidate a plurality of virtual machines on a plurality of physical cores, each communicably coupled to a respective one of a corresponding plurality of physical caches, the method comprising:

determining, by performance monitoring circuitry, performance data indicative of at least one parameter logically associated with each of a plurality of virtual machines;

determining, by resource monitoring circuitry, resource data indicative of:

at least one physical core parameter logically associated with each of the plurality of physical cores; and at least physical cache parameter logically associated with each of the plurality of physical caches, each of the physical caches communicably coupled to a respective one of the plurality of physical cores; and determining, by power management circuitry, whether at least two of the plurality of virtual machines can be consolidated in a first physical core included in the plurality of physical cores based on the at least one physical core parameter received from the resource monitoring circuitry;

responsive to a successful determination that the at least two virtual machines can be consolidated in the first physical core based on the at least one physical core parameter, determining, by the power management circuitry, whether the at least two of the plurality of virtual machines can be consolidated in a first physical cache coupled to the first physical core based on the at least one physical cache parameter received from the resource monitoring circuitry, wherein the at least one physical cache parameter includes one or more of cache turnover or cache access time; and consolidating, by the power management circuitry, the at least two virtual machines on the first physical core responsive to a successful determination that:

the at least two virtual machines can be consolidated in the first physical core based on the at least one physical core parameter; and the at least two of the plurality of virtual machines can be consolidated in a first physical cache based on the at least one physical cache parameter.

11. The performance monitoring method of claim 10 wherein determining performance data indicative of at least one parameter logically associated with each of a plurality of virtual machines comprises:

determining, by performance determination circuitry communicably coupled to the performance monitoring circuitry, a value indicative of a performance parameter for each of the plurality of virtual machines based at least in part on the determined performance data; and communicating the determined value indicative of the performance parameter for each of the plurality of virtual machines to the power management circuitry.

12. The performance monitoring method of claim 11 wherein determining a value indicative of a performance parameter for each of the plurality of virtual machines comprises:

determining, by the performance monitoring circuitry, virtual CPU utilization data logically associated with each of at least some of the plurality of virtual machines.

13. The performance monitoring method of claim 10, further comprising:

determining, by resource allocation determination circuitry communicably coupled to the resource monitoring circuitry, a value indicative of a physical resource allocation for each of the plurality of virtual machines based at least in part on the determined resource data; and communicating the determined value indicative of the physical resource allocation for each of the plurality of virtual machines to the power management circuitry.

14. The performance monitoring method of claim 13, further comprising:

retrieving, by the resource allocation determination circuitry from at least one communicably coupled storage device, data representative of one or more resource allocation policies.

15. The performance monitoring method of claim 14 wherein determining a value indicative of a physical resource allocation for each of the plurality of virtual machines based at least in part on the determined resource allocation data comprises:

determining, by the resource allocation determination circuitry, a value indicative of a physical resource allocation for each of the plurality of virtual machines based at least in part on the determined resource allocation data and based at least in part on the one or more resource allocation policies.

16. The performance monitoring method of claim 10 wherein determining resource data indicative of at least a physical cache parameter logically associated with each of a plurality of physical caches comprises:

determining, by resource allocation determination circuitry communicably coupled to the resource monitoring circuitry and to the power management circuitry, a value indicative of a physical cache utilization trend logically associated with at least some of the plurality of physical caches; and communicating the determined value indicative of the physical cache utilization trend to the power management circuitry.

17. The performance monitoring method of claim 10 wherein determining resource data indicative of at least at least one physical core parameter logically associated with each of a plurality of physical cores comprises:

determining, by resource allocation determination circuitry communicably coupled to the resource monitoring circuitry and to the power management circuitry, a value indicative of a physical core utilization logically associated with at least some of the plurality of physical cores; and communicating the determined value indicative of the physical core utilization to the power management circuitry.

18. The performance monitoring method of claim 10 wherein determining resource data indicative of at least at least one physical core parameter logically associated with each of a plurality of physical cores comprises:

determining, by resource allocation determination circuitry communicably coupled to the resource monitoring circuitry and to the power management circuitry, a value indicative of a physical core utilization trend logically associated with at least some of the plurality of physical cores; and communicating the determined value indicative of the physical core utilization trend to the power management circuitry.

19. A performance monitoring system to consolidate a plurality of virtual machines on a plurality of physical cores, each communicably coupled to a respective one of a corresponding plurality of physical caches, the system comprising:

a means for determining performance data indicative of at least one parameter logically associated with each of a plurality of virtual machines;

a means for determining resource data indicative of:
at least one physical core parameter logically associated with each of the plurality of physical cores; and
at least physical cache parameter logically associated with each of the plurality of physical caches, each of the physical caches communicably coupled to a respective one of the plurality of physical cores; and a means for determining whether at least two of the plurality of virtual machines can be consolidated in a first physical core included in the plurality of physical cores based on the at least one physical core parameter received from the resource monitoring circuitry: a means for determining, by the power management circuitry, whether the at least two of the plurality of virtual machines can be consolidated in a first physical cache coupled to the first physical core based on the at least one physical cache parameter received from the resource monitoring circuitry responsive to a successful determination that the at least two virtual machines can be consolidated in the first physical core based on the at least one physical cache parameter, wherein the at least one physical cache parameter includes one or more of cache turnover or cache access time; and a means for consolidating, by the power management circuitry, the at least two virtual machines on the first physical core responsive to a successful determination that:
the at least two virtual machines can be consolidated in the first physical core based on the at least one physical cache parameter; and
the at least two of the plurality of virtual machines can be consolidated in a first physical cache based on the at least one physical cache parameter.

20. The performance monitoring system of claim 19, further comprising:

a means for determining, by resource allocation determination circuitry communicably coupled to the resource monitoring circuitry, a value indicative of a physical resource allocation for each of the plurality of virtual machines based at least in part on the determined resource data; and a means for communicating the determined value indicative of the physical resource allocation for each of the plurality of virtual machines to the power management circuitry.

21. The performance monitoring system of claim 20, further comprising:

a means for retrieving, by the resource allocation determination circuitry from at least one communicably coupled storage device, data representative of one or more resource allocation policies.

22. A storage device that includes one or more machine readable instruction sets, that when executed by circuitry, cause the circuitry to transform to a virtual machine manager, the virtual machine manager to:

cause performance monitoring circuitry to determine performance data indicative of at least one parameter logically associated with each of a plurality of virtual machines;

cause resource monitoring circuitry to determine resource data indicative of:
at least one physical core parameter logically associated with each of a plurality of physical cores; and
at least physical cache parameter logically associated with each of a plurality of physical caches, each of the physical caches communicably coupled to a respective one of the plurality of physical cores; and cause power management circuitry to determine whether at least two of the plurality of virtual machines can be consolidated in a first physical core included in the plurality of physical cores based on the at least one physical core parameter received from the resource monitoring circuitry:

responsive to a successful determination that the at least two virtual machines can be consolidated in the first physical core based on the at least one physical core parameter, determine whether the at least two of the plurality of virtual machines can be consolidated in a first physical cache coupled to the first physical core based on the at least one physical cache parameter received from the resource monitoring circuitry, wherein the at least one physical cache parameter includes one or more of cache turnover or cache access time; and consolidate the at least two virtual machines on the first physical core responsive to a successful determination that:
  the at least two virtual machines can be consolidated in the first physical core based on the at least one physical core parameter; and
  the at least two of the plurality of virtual machines can be consolidated in a first physical cache based on the at least one physical cache parameter.

23. The storage device of claim 22, wherein the machine readable instructions cause the virtual machine manager to further:
  cause resource allocation determination circuitry communicably coupled to the resource monitoring circuitry to determine a value indicative of a physical resource allocation for each of the plurality of virtual machines based at least in part on the determined resource data; and
  cause the resource allocation determination circuitry to communicate to the power management circuitry the determined value indicative of the physical resource allocation for each of the plurality of virtual machines.

24. The storage device of claim 23 wherein the machine readable instructions cause the virtual machine manager to further:
  cause the resource allocation determination circuitry to retrieve from at least one communicably coupled storage device, data representative of one or more resource allocation policies.

* * * * *